(12) United States Patent
Bangs et al.

(10) Patent No.: US 8,510,140 B2
(45) Date of Patent: Aug. 13, 2013

(54) SYSTEMS, APPARATUS, AND METHODS FOR FACILITATING PRODUCT DEVELOPMENT

(75) Inventors: Richard Alan Bangs, Colleyville, TX (US); Marlea D. Steelman, Denton, TX (US); Donna H. Woods, Colleyville, TX (US); John S. Toczydlowski, Jr., Philadelphia, PA (US); James D. Wiseman, Columbia, MD (US); Mark D. Keye, New Rochelle, NY (US); Carolyn A. Cunningham, Manhasset, NY (US); Naila Mahmud, Great Neck, NY (US); Peter M. Bahr, Duxbury, MA (US); Cindy R. Jones, Highland Village, TX (US); Sean M. Choate, Bedford, TX (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 312 days.

(21) Appl. No.: 12/507,488

(22) Filed: Jul. 22, 2009

(65) Prior Publication Data

US 2010/0017250 A1    Jan. 21, 2010

Related U.S. Application Data

(62) Division of application No. 10/233,660, filed on Sep. 4, 2002, now abandoned.

(51) Int. Cl.
*G06Q 10/00* (2012.01)

(52) U.S. Cl.
USPC .......................................... 705/7.11; 700/97

(58) Field of Classification Search
USPC ............................................ 705/7.11; 700/97
See application file for complete search history.

(56) References Cited

U.S. PATENT DOCUMENTS

| | | | | |
|---|---|---|---|---|
| 5,687,094 | A * | 11/1997 | Kagawa et al. | 700/104 |
| 6,233,493 | B1 | 5/2001 | Cherneff et al. | |
| 6,901,372 | B1 * | 5/2005 | Helzerman | 705/7.14 |
| 7,051,036 | B2 | 5/2006 | Rosnow et al. | |
| 7,127,410 | B1 * | 10/2006 | Butler et al. | 705/7.11 |
| 2002/0052807 | A1 * | 5/2002 | Han et al. | 705/27 |
| 2002/0059512 | A1 * | 5/2002 | Desjardins | 713/1 |

(Continued)

FOREIGN PATENT DOCUMENTS
WO    WO 00/42505    7/2000

OTHER PUBLICATIONS

Roy and Kodkani, Collaborative product conceptualization tool using web technology, Computers in Industry 41 (2000) p. 195-209.*

(Continued)

*Primary Examiner* — Justin M Pats

(57) ABSTRACT

Systems, apparatus, and methods are provided to facilitate product development by linking stages of product development with the allocation of resources and support for the product. Products are developed based on a structured framework having distinct stages in which each stage builds upon information of previous stages. At the end of each stage, a review is conducted to determine whether the product is suitable for further development. Upon each review, an integrated set of tools is used to identify and link the product with resources and support needed for the product. In addition, the tools assist in automatically identifying the resources and support needed for the product as it progresses through each stage.

16 Claims, 27 Drawing Sheets

(56) References Cited

U.S. PATENT DOCUMENTS

| | | |
|---|---|---|
| 2002/0107722 A1 | 8/2002 | Laurin et al. |
| 2002/0120490 A1 | 8/2002 | Gajewski et al. |
| 2002/0165742 A1 | 11/2002 | Robins |
| 2002/0165744 A1 | 11/2002 | Juras et al. |
| 2002/0178044 A1* | 11/2002 | Bicknell et al. .................. 705/9 |
| 2003/0033311 A1 | 2/2003 | Skinner |
| 2003/0036913 A1 | 2/2003 | Blair et al. |
| 2003/0055659 A1* | 3/2003 | Alling ............................. 705/1 |
| 2003/0069659 A1* | 4/2003 | Wada et al. .................. 700/108 |
| 2003/0097309 A1 | 5/2003 | Gibler et al. |
| 2003/0225470 A1* | 12/2003 | Demetriou et al. .......... 700/100 |
| 2003/0236692 A1 | 12/2003 | Hertel-Szabadi |
| 2009/0132350 A1* | 5/2009 | Laurin et al. .................. 705/10 |

OTHER PUBLICATIONS

Toye et al., SHARE: A Methodology and Environment for Collaborative Product Development, In Post-Proceedings for the IEEE Infrastructure for Collaborative Enterprises, 1993, p. 1-16.*

Huang et al., POPIM: Pragmatic Online Project Information Management for Collaborative Product Development, The Sixth International Conference on Computer Supported Cooperative Work in Design, Jul. 2001, p. 255-260.*

Roy and Kodkani, Product modeling within the framework of the World Wide Web, IEE Transactions vol. 31, 1999, p. 667-77.*

Air Force Materiel [sic] Command Guide on Integrated Product Development, May 25, 1993, p. 1-122.*

Air Force Material Command Guide on Integrated Product Development, May 25, 1993, p. 1-122.

Huang (Huang, G.O., Feng, X.B., Mak, K.L., "POPIM: Pragmatic Online Project Information Management for Collaborative Product Development", Computer Supported Cooperative Work in Design, The Sixth International Conference on Jul. 12-14, 2001) discloses a web-based platform for managing collaborative product development projects within an extended en.

* cited by examiner

400

PRODUCT DEVELOPMENT PROCESS > HOME

| STAGE 1 CONCEPT ASSESSMENT | DECISION GATE | STAGE 2 CONCEPT ANALYSIS & DESIGN | DECISION GATE | STAGE 3 PLANNING | DECISION GATE | STAGE 4 DEVELOPMENT & TRIALS | DECISION GATE | STAGE 5 PRODUCT LAUNCH & DEPLOYMENT | DECISION GATE | STAGE 6 LIFE CYCLE MANAGEMENT |

HOME

OVERVIEW

SUBMIT IDEA

CONTACT INFORMATION

PIPELINE REPORTS

TEMPLATES

PRODUCT REVIEW COMMITTEE

FIND

HELP

[CANCEL]  [SUBMIT]

IDEA SUBMISSION FORM

PLEASE ANSWER ALL APPROPRIATE QUESTIONS IN THE SPACES PROVIDED BELOW. (REQUIRED FIELDS IN BLUE)

IDEA SUBMITTER INFORMATION

STEP 1:
ENTER LAST NAME: [-ENTER LAST NAME-]
CLICK 'FIND...'  [FIND...]

STEP 2:
SELECT YOUR NAME FROM THE LIST: [LAST NAME NOT FOUND. CLICK ADD...TO BE ADDED TO THE DATABASE ▼]
IF NOT IN THE LIST, CLICK 'ADD...' [ADD...]

PRODUCT INFORMATION

NAME OF PRODUCT IDEA: [           ]
DATE: [           ]
LINE OF BUSINESS: [-CHOOSE BELOW- ▼]

GENERAL INFORMATION

BRIEFLY DESCRIBE THE NEW PRODUCT OR SERVICE IDEA.

I. IDEA SOURCE: [           ]
(I.E., WHAT INSPIRED THIS IDEA? CUSTOMER FEEDBACK, PERSONAL EXPERIENCE, ETC.)

II. OPERATING FEATURES/FUNCTIONALITY: [           ]
(I.E., DESCRIBE WHAT THE PRODUCT WILL DO)

III. CUSTOMER REALIZED PRODUCT BENEFITS: [           ]
(I.E., WHAT CUSTOMER PROBLEM OR NEED IS SATISFIED?)

IV. TARGET CUSTOMERS: [           ]
(I.E., WHO ARE THE TARGET CUSTOMERS OR MARKETS?)

V. COMPANY REALIZED PRODUCT BENEFITS: [           ]
(I.E., WHAT IS THE BENEFIT TO VERIZON?)

VI. POTENTIAL RISKS: [           ]
(I.E., IS THERE CROSS-ELASTICITY WITH OTHER PRODUCTS OR LEGAL/REGULATORY ISSUES?)

VII. OPERATING AND TECHNOLOGY REQUIREMENTS: [           ]
(I.E., DO YOU KNOW HOW IT MIGHT WORK?)

VIII. LIST OTHER REASONS FOR PROVIDING THIS PRODUCT: [           ]
(I.E., PRETEND YOU ARE SELLING IDEA TO ANY EXECUTIVE, WHY SHOULD VERIZON OFFER IT?)

[CANCEL]                                                                [SUBMIT]

FIG. 4

PRODUCT DEVELOPMENT PROCESS
PIPELINE REPORT
ACTIVE BY PRODUCT NAME-ALL LOBS

| | STAGE 1 CONCEPT ASSESSMENT | STAGE 2 CONCEPT ANALYSIS & DESIGN | STAGE 3 PLANNING | STAGE 4 DEVELOPMENT & TRIALS | STAGE 5 PRODUCT LAUNCH & DEPLOYMENT | STAGE 6 LIFE CYCLE MANAGEMENT |
|---|---|---|---|---|---|---|
| BUSINESS SOLUTIONS | ☐ | ☐ | ☐ | ☐ | ☐ | ☐ |
| CONSUMER | ☐ | ☐ | ☐ | ☐ | ☐ | ☐ |
| E-BUSINESS | ☐ | ☐ | ☐ | ☐ | ☐ | ☐ |
| ENTERPRISE SOLUTIONS | ☐ | ☐ | ☐ | ☐ | ☐ | ☐ |
| WHOLESALE | ☐ | ☐ | ☐ | ☐ | ☐ | ☐ |

FIG. 13

PRODUCT DEVELOPMENT PROCESS
PIPELINE REPORT
ACTIVE BY PRODUCT NAME-ALL LOBS

|  | REJECTED | ON HOLD | TRANSFERRED | OTHER | EXIT |
|---|---|---|---|---|---|
| BUSINESS SOLUTIONS | ☐ | ☐ | ☐ | ☐ | ☐ |
| CONSUMER | ☐ | ☐ | ☐ | ☐ | ☐ |
| E-BUSINESS | ☐ | ☐ | ☐ | ☐ | ☐ |
| ENTERPRISE SOLUTIONS | ☐ | ☐ | ☐ | ☐ | ☐ |
| WHOLESALE | ☐ | ☐ | ☐ | ☐ | ☐ |

| STAGE 1 CONCEPT ASSESSMENT | ◇DECISION GATE | STAGE 2 CONCEPT ANALYSIS & DESIGN | ◇DECISION GATE | STAGE 3 PLANNING | ◇DECISION GATE | STAGE 4 DEVELOPMENT & TRIALS | ◇DECISION GATE | STAGE 5 PRODUCT LAUNCH & DEPLOYMENT | ◇DECISION GATE | STAGE 6 LIFECYCLE MANAGEMENT |
|---|---|---|---|---|---|---|---|---|---|---|

PRODUCT REVIEW COMMITTEE

HOME

OVERVIEW

SUBMIT IDEA

CONTACT INFORMATION

PIPELINE REPORTS

TEMPLATES

PRODUCT REVIEW COMMENTS

FIND

HELP

| NAME | ORGANIZATION | PHONE # |
|---|---|---|
| | CHAIRPERSON, REPRESENTING THE FACTORY | |
| | LEGAL | |
| | TECHNOLOGY | |
| | SOURCING | |
| | INFORMATION TECHNOLOGY | |
| | INFORMATION TECHNOLOGY | |
| | ENGINEERING & PLANNING | |
| | NETWORK OPERATIONS | |
| | NATIONAL OPERATIONS | |
| | RETAIL SYSTEMS INITIATIVES | |
| | WHOLESALE SERVICES | |
| | WHOLESALE SERVICES | |
| | WHOLESALE SERVICES | |
| | ESG-SUPPLIER MANAGEMENT | |
| | BSG-PRODUCT MANAGEMENT | |
| | CONSUMER-CHANNEL MANAGEMENT | |
| | WHOLESALE PRODUCT MANAGEMENT-ACCESS | |
| | WHOLESALE PRODUCT MANAGEMENT-LOCAL | |
| | ESG-OFFER MANAGEMENT | |
| | BSG-PRODUCT MANAGEMENT | |
| | CONSUMER-PRODUCT MANAGEMENT | |
| | FINANCE-WHOLESALE | |
| | FINANCE-ENTERPRISE SOLUTIONS GROUP (ESG) | |
| | FINANCE-CONSUMER & BUSINESS SOLUTIONS GROUP (BSG) | |

EDIRECTORY   SEARCH   WEB GUIDE   CONTACT WEB   LEGAL NOTICE

CONCEPT PAPER
*(NO MORE THAN 5 PAGES)*

I. ADMINISTRATION INFORMATION
   - ORIGINATOR'S NAME, TITLE, TELEPHONE NUMBER
   - SPONSORING ORGANIZATION/MARKET SEGMENT
   - PRODUCT OR TECHNOLOGY NAME
   - DATE PREPARED

II. CONCEPT DESCRIPTION
   - DESCRIBE PRODUCT/SERVICE, WHAT IT WILL BE AND DO INCLUDING ATTRIBUTES AND FEATURES
   - DISCUSS OVERALL NATURE AND COMPLEXITY OF THE PRODUCT TECHNOLOGY

III. MARKET ASSESSMENT
   - IDENTIFY TARGET MARKET(S)
   - ESTIMATE MARKET SIZE AND ATTRACTIVENESS
   - ESTIMATE VERIZON MARKET SHARE; EXPLAIN WHY VERIZON SHOULD ENTER THIS MARKET
   - ESTIMATE PRODUCT/SERVICE PRICE AND DEVELOPMENT TIME

IV. CUSTOMER REQUIREMENTS
   - DESCRIBE THE CUSTOMER NEED, WANT, OR DESIRE BEING MET
   - IDENTIFY ANY CUSTOMER PROBLEMS THAT WILL BE SOLVED AND COMPETITIVE ADVANTAGES REALIZED

V. COMPETITIVE SITUATION
   - IDENTIFY MAJOR COMPETITORS
   - DISCUSS VERIZON'S STRENGTH AND WEAKNESSES AS THEY RELATE TO THE PROPOSED CONCEPT

VI. STRATEGIC ASSESSMENT
   - DISCUSS WHICH VERIZON STRATEGY THE PROJECT SUPPORTS
   - DISCUSS ALIGNMENT WITH MARKET SEGMENT STRATEGIES AND OBJECTIVES
   - DISCUSS RISKS INVOLVED IN EITHER DEPLOYING OR NOT DEPLOYING THIS PRODUCT/SERVICE

*FIG. 19*

I. REVENUE POTENTIAL WITHIN 2 YEARS  
1-LIMITED ($0 TO $499K)  
2-MODERATE ($500K-$999K)  
3-SIGNIFICANT ($1M OR MORE)

II. MARKET SHARE POTENTIAL WITHIN 2 YEARS  
1-LIMITED (LESS THAN 1%)  
2-MODERATE (BETWEEN 1-5%)  
3-SIGNIFICANT (MORE THAN 5%)

III. COMPETITIVE ENVIRONMENT  
1-STIFF COMPETITION-WELL DEVELOPED MARKET  
2-SOME COMPETITIVE OFFERINGS ALREADY IN MARKET  
3-LITTLE TO NO COMPETITIVE PRESSURES-UNDERDEVELOPED MARKET

IV. GROWTH POTENTIAL  
1-LIMITED GROWTH POTENTIAL; MARKET GROWTH IS SLOWING OR ON THE DECLINE  
2-SOME GROWTH LIKELY  
3-HIGH GROWTH POTENTIAL; NEW OR EMERGING MARKET; PRODUCTS/SERVICES ARE INTRODUCTION STAGE OF LIFECYCLE

V. PRICING  
1-LOTS OF PRICING PRESSURE; HIGHLY PRICE SENSITIVE TARGET CUSTOMERS  
2-SOME PRICING PRESSURE AND PRICING SENSITIVITY  
3-LIMITED PRICING PRESSURE AND PRICING SENSITIVITY

VI. PRODUCT/SERVICE DIFFERENTIATION  
1-LITTLE OR NO PRODUCT/SERVICE DIFFERENTIATION  
2-SOME PRODUCT/SERVICE DIFFERENTIATION  
3-HIGHLY DIFFERENTIATED PRODUCT/SERVICE

VII. CUSTOMER/MARKET VALUE OR NEED  
1-PRODUCT/SERVICE OFFERING ADDRESS SOME CUSTOMER/MARKET NEED; WILL BE PERCEIVED AS MARGINALLY BENEFICIAL LIMITED DIFFERENTIATION  
2-PRODUCT/SERVICE OFFERING IS RELATED TO A SPECIFIC CUSTOMER/MARKET NEED; WILL BE PERCEIVED AS BENEFICIAL, SOMEWHAT DIFFERENTIATED  
3-PRODUCT/SERVICE OFFERING IS TIED TO SPECIFIC CUSTOMER/MARKET NEED; WILL BE PERCEIVED AS HIGH VALUE ADD, VERY DIFFERENTIATED

VIII. PRODUCT LINE RATIONALIZATION  
1-REPOSITION: IMPROVE THE PROFITABILITY, MARKETING POTENTIAL/FIT OR COMPETITIVE POSITIONING  
2-EMPHASIZE-RETAIN: PRESERVE OVERALL REVENUE STREAM, MARKET SHARE AND COMPETITIVE POSITIONING  
3-EMPHASIZE-GROW: INCREASE MARKET SHARE, STIMULATE REVENUE GROWTH AND ENHANCE COMPETITIVE POSITIONING

IX. PRODUCT/PLATFORM  
1-EMERGING/VOLATILE: USEFUL LIFE UNKNOWN  
2-TRANSITIONAL: USEFUL LIFE 2 TO 5 YEARS  
3-STABLE: USEFUL LIFE 5 OR MORE YEARS

X. OPERATING CAPABILITIES  
1-SIGNIFICANT RESOURCES AND ENHANCEMENTS REQUIRED ($1M OR MORE)  
2-MODERATED RESOURCES AND ENHANCEMENTS REQUIRED ($51K OR $999K)  
3-NONE OR MINIMAL RESOURCES AND ENHANCEMENTS REQUIRED ($0 TO $520K)

XI. LEGAL/REGULATORY ISSUES  
1-BENEFITS SLIGHTLY OFFSET RISKS ASSOCIATED WITH PROVIDING PRODUCT  
2-BENEFITS MODERATELY OFFSET RISKS ASSOCIATED WITH PROVIDING PRODUCT  
3-BENEFITS HIGHLY OFFSET RISKS ASSOCIATED WITH PROVIDING PRODUCT

PROJECT TOTAL   0

FIG. 20

SERVICE DESCRIPTION TEMPLATE

1. SERVICE OVERVIEW
2. APPLICATION SCENARIOS
    - 2.1 APPLICATION SCENARIO 1
    - 2.2 APPLICATION SCENARIO X
3. BUSINESS UNIT DRIVERS
4. REVENUE ANALYSIS
5. SERVICE AUDIENCE
6. HUMAN FACTORS
7. TECHNICAL ASSESSMENT/NETWORK ARCHITECTURE
8. TRIAL AND DEPLOYMENT PLANS
9. TARGET SERVICE DATE
10. RISK ANALYSIS
11. REGULATORY AND KEY ISSUES
12. ATTACHMENTS
    - 12.1 GLOSSARY/ACRONYMS
    - 12.2 REFERENCES

LIST OF FIGURES

*FIG. 21*

OPPORTUNITY ASSESSMENT
(ASSUMPTION BASED HIGH LEVEL ORDER OF MAGNITUDE
ASSESSMENT USING THE STANDARD BUSINESS CASE TEMPLATE)

BUSINESS UNIT: _____  DATE: _____

TITLE OF PROJECT _____

PRIORITY (CIRCLE):   EXTREME   HIGH   MEDIUM   LOW

TYPE OF PROJECT:

___ SERVICE IMPROVEMENT        ___ REGULATORY/LEGAL/MANDATORY
___ INFRASTRUCTURE             ___ REVENUE PRODUCTION
___ COST REDUCTION/EFFICIENCIES ___ OTHER

DEFINE OTHER:

1. EXECUTIVE SUMMARY
   - 1.1 BRIEF DESCRIPTION
   - 1.2 IDENTIFY DRIVER
   - 1.3 SUMMARY OF RESOURCE REQUIREMENTS (ORDER OF MAGNITUDE CAPITAL, EXPENSE AND HEADCOUNT ESTIMATES)
   - 1.4 OPERATIONAL BENEFITS (E.G., SERVICE IMPROVEMENTS, DOR REDUCTIONS, ETC.)
   - 1.5 FINANCIAL BENEFITS (E.G., NEW/RETAINED REVENUE, EFFICIENCIES, COST REDUCTIONS, ETC.)

2. PROJECT DESCRIPTION:
   - 2.1 PROJECT DESCRIPTION (WHAT)
   - 2.2 WHY NOW (WHEN)
   - 2.3 PROJECT BENEFITS AND ATTRIBUTES (WHY)
   - 2.4 HIGH-LEVEL ARCHITECTURE AND APPROACH (HOW)
   - 2.5 LINKAGE AND DEPENDENCIES (IF KNOWN)
     - THIS PROJECT TO OTHER PROJECTS
     - TECHNOLOGY DEPENDENCIES
     - PROCESS STANDARDS DEPENDENCIES
     - DEVELOPMENT & ENHANCEMENTS REQUIRED FOR INTERNAL SYSTEMS (E.G. BILLING)
   - 2.6 EXISTING PRODUCT CROSS-ELASTICITY (IF KNOWN)
   - 2.7 ASSOCIATED CONTRACTUAL OBLIGATIONS (IF APPLICABLE)

*FIG. 22A*

3. MARKET ASSESSMENT:

3.1 MARKET OVERVIEW
    3.2 CORPORATE STRATEGY ADVANCED BY PROJECT
    3.3 BUSINESS UNIT STRATEGY ADVANCED BY PROJECT
    3.4 TARGET MARKET ESTIMATES
      - MARKET SIZE
      - MARKET GROWTH RATE
      - UNIT FORECAST (ATTACHMENT A)
    3.5 MARKET BARRIERS TO ENTRY
    3.6 MARKET PENETRATION ESTIMATES
    3.7 MARKET WINDOW/TIMING
    3.8 PRODUCT LIFE CYCLES
    3.9 PRICING ASSESSMENT
      - PRICE ATTRACTIVENESS
      - PRICE SENSITIVITY
      - FUTURE DIRECTION OF MARKET PRICING

4. COMPETITIVE ASSESSMENT:

4.1 OVERALL COMPETITIVE ASSESSMENT
    4.2 COMPETITOR PROFILES
    4.3 COMPARISON OR PLANNED VERIZON OFFERING TO COMPETITORS' OFFERINGS
    4.4 QUALITY IMPACTS
      - RISKS
      - IMPROVEMENTS
    4.5 VERIZON OPERATION CAPABILITIES (CAPABILITIES TO BRING TECHNOLOGY TO MARKET)

5. LEGAL AND REGULATORY:

5.1 CRITICAL LEGAL AND REGULATORY ISSUES
    5.2 LEGAL/REGULATORY RISK

6. RISK ASSESSMENT:

6.1 RISK MITIGATION (ON INVESTMENT)
    6.2 RISK IF NOT IMPLEMENTED

*FIG. 22B*

STANDARD BUSINESS CASE TEMPLATE - NARRATIVE INSTRUCTIONS

BUSINESS UNIT: _____ DATE: _____ BC#: ☐
TITLE OF PROJECT: _____

PRIORITY CIRCLE):      EXTREME      HIGH      MEDIUM      LOW

TYPE OF PROJECT: _____

___ SERVICE IMPROVEMENT      ___ REGULATORY/LEGAL/MANDATORY
___ INFRASTRUCTURE      ___ REVENUE PRODUCTION
___ COST REDUCTION/EFFICIENCIES      ___ OTHER

DEFINE OTHER:
(NOTE: SECTIONS 3 THROUGH 5, AND SECTIONS 7 THROUGH 10, SHOWN BELOW IN *RED ITALICS* ARE REQUIRED ONLY IF THE TOTAL CASH OUTLAY (BOTH CAPITAL AND EXPENSE COMBINED) EXCEEDS $25M OVER THE DEPLOYMENT LIFE OF THE INITIATIVE. ALL OTHER SECTIONS ARE REQUIRED REGARDLESS OF TOTAL CASH OUTLAY.)

1.    EXECUTIVE SUMMARY (ONE PARAGRAPH):

1.1    BRIEF DESCRIPTION
       1.2    IDENTIFY DRIVER
       1.3    SUMMARY OF RESOURCE REQUIREMENTS (CAPITAL, EXPENSE, HEADCOUNT)
       1.4    OPERATIONAL BENEFITS (SERVICE IMPROVEMENTS, DOR REDUCTIONS, ETC.)
       1.5    FINANCIAL BENEFITS (NEW/RETAINED REVENUE, PAYBACK PERIOD FROM BCFM, EFFICIENCIES, COST REDUCTIONS, ETC.)
       1.6    RISKS IF NOT DONE

2.    PROJECT DESCRIPTION:

2.1    PROJECT DESCRIPTION (WHAT)
       2.2    WHY NOW (WHEN)
       2.3    PROJECT BENEFITS AND ATTRIBUTES (WHY)
       2.4    WAS A MARKET TRIAL DONE AND BY WHO? IF SO, WHAT WERE THE RESULTS?
       2.5    HIGH-LEVEL ARCHITECTURE AND APPROACH (HOW)
       2.6    LINKAGE AND DEPENDENCIES
            - THIS PROJECT TO OTHER PROJECTS
            - TECHNOLOGY DEPENDENCIES
            - PROCESS STANDARDS DEPENDENCIES
            - DEVELOPMENT & ENHANCEMENTS REQUIRED FOR INTERNAL SYSTEMS (E.G. BILLING)? HAVE THEY BEEN INCLUDED IN THE FINANCIALS (COSTS)?
       2.7    INTENDED GEOGRAPHIC DEPLOYMENT (WHERE)
            - BY STATE/ASCENDING ORDER OF IMPORTANCE
       2.8    EXISTING PRODUCT CANNIBALIZATION/ARBITRAGE
       2.9    ASSOCIATED CONTRACTUAL OBLIGATIONS

*FIG. 23A*

STANDARD BUSINESS CASE TEMPLATE - NARRATIVE INSTRUCTIONS

3. PROJECT MANAGEMENT 3.1   IDENTIFY WHO IS RESPONSIBLE FOR DEVELOPING AND MANAGING THE PROJECT DEPLOYMENT PLAN.
    3.2   IDENTIFY THE ORGANIZATION RESPONSIBLE FOR ENSURING PROJECT SUCCESS.
    3.3   IDENTIFY THE RESOURCE AND CRITICAL SUCCESS MEASURES TO BE TRACKED.

4. MARKET ASSESSMENT:

4.1   MARKET OVERVIEW
    4.2   CORPORATE STRATEGY ADVANCED BY PROJECT
    4.3   BUSINESS UNIT STRATEGY ADVANCED BY PROJECT
    4.4   MARKET STRUCTURE AND BEHAVIOR
- MARKET SIZE BY STATE
- MARKET GROWTH RATE BY STATE
- IMPACT OF DEMAND FLUCTUATION
- DIFFICULTY OF MEETING CUSTOMER REQUIREMENTS
- GENERAL DIRECTION OF MARKET SUPPLY AND DEMAND
    4.5   MARKET BARRIERS TO ENTRY
    4.6   MARKET PENETRATION
    4.7   MARKET WINDOW/TIMING
    4.8   PRODUCT LIFE CYCLES
- PRODUCT LIFE CYCLE
- HARDWARE LIFE CYCLE
- SOFTWARE LIFE CYCLE
    4.9   PRICING ASSESSMENT
- PRICE ATTRACTIVENESS
- PRICE SENSITIVITY
- FUTURE DIRECTION OF MARKET PRICING

5. COMPETITIVE ASSESSMENT:

5.1   OVERALL COMPETITIVE ASSESSMENT
    5.2   COMPETITOR PROFILES
    5.3   COMPARISON OF PLANNED VERIZON OFFERING TO COMPETITORS' OFFERINGS
    5.4   OPERATING REQUIREMENTS FOR INFRASTRUCTURE AND SYSTEMS
- INFRASTRUCTURE REQUIREMENTS
- INTERNAL SOFTWARE DEVELOPMENT (D&E)
- MAINTENANCE REQUIREMENTS
- TRAINING REQUIREMENTS
    5.5   QUALITY IMPACTS
- RISKS
- IMPROVEMENTS
    5.6   VERIZON OPERATING CAPABILITIES (CAPABILITIES TO BRING TECHNOLOGY TO MARKET)

*FIG. 23B*

STANDARD BUSINESS CASE TEMPLATE - NARRATIVE INSTRUCTIONS

6. LEGAL AND REGULATORY:

6.1   TARIFF REQUIREMENTS
    6.2   CRITICAL LEGAL AND REGULATORY ISSUES
    6.3   LEGAL/REGULATORY RISK

7. TIME TABLE 7.1   TECHNICAL/OPERATIONAL/MARKET TRIAL (IF APPLICABLE)
    7.2   PRODUCT DEPLOYMENT SCHEDULE (IF APPLICABLE)
    7.3   PROJECT MILESTONE DATES
          - IMPLEMENTATION PHASE
          - CONTINUOUS OPERATION PHASE

8. RISK ASSESSMENT:

8.1   RISK MITIGATION (ON INVESTMENT)
    8.2   RISK IF NOT IMPLEMENTED

9. EXIT/MIGRATION STRATEGY:

9.1   MARKET BARRIERS TO EXIT
    9.2   LIKELY EXIT/MIGRATION SCENARIOS
    9.3   EXIT/MIGRATION STRATEGY IF PRODUCT IS NOT SUCCESSFUL

10. ALTERNATIVES:

10.1   ALTERNATIVES CONSIDERED AND HOW SELECTION OF RECOMMENDED ALTERNATIVE WAS MADE.
    10.2   RELATIVE NUMBER OF ALTERNATIVES

11. FINANCIALS:

11.1   COMPLETE STANDARD BUSINESS CASE FINANCIAL TEMPLATE AND ATTACH TO BUSINESS CASE.
    11.2   RUN FINANCIALS THROUGH BUSINESS CASE FINANCIAL ANALYSIS MODELING TOOL AT THE FOLLOWING WEB SITE: HTTP://CWW.BELL-ATL.COM/FINANCE/BCFM/ AND ATTACHED OUTPUT TO BUSINESS CASE.
    11.3   DEMONSTRATE CAUSE AND EFFECT RELATIONSHIP BETWEEN PROJECT COSTS AND BENEFITS.

*FIG. 23C*

STAGE 4 PROJECT WORK PLAN - PAGE 1

| ID | TASK NAME | DURATION | START | FINISH | PREDECESSORS | KEY RESOURCE | SUPPORT RESOURCE |
|---|---|---|---|---|---|---|---|
| 1 | FUNDING APPROVED | 0 DAYS | DAY 1 | DAY 1 | | PROD MGR | |
| 2 | DEVELOPMENT AND TRIALS PHASE | 134 DAYS | DAY 1 | DAY 134 | FUNDING APPROVED | PJM | |
| 3 | DEVELOP CHANNEL & MKTG DEPLOYMENT PLAN (MARKETING PLAN) | 5 DAYS | DAY 1 | DAY 5 | | PROD MGR | |
| 4 | EXECUTIVE SUMMARY | 5 DAYS | DAY 1 | DAY 5 | | PROD MGR | |
| 5 | CUSTOMER PURCHASE ANALYSIS AND PLAN | 5 DAYS | DAY 1 | DAY 5 | | PROD MGR | |
| 6 | MARKETING COMMUNICATIONS AND PROMOTIONS PLAN | 5 DAYS | DAY 1 | DAY 5 | | PROD MGR | MRKT MGT |
| 7 | CHANNEL AND SALES MANAGEMENT PLAN | 5 DAYS | DAY 1 | DAY 5 | | PROD MGR | ACCT MGT, CHAN MGT |
| 8 | RESOURCE, PERFORMANCE MONITORING, AND TIMING REQUIREMENTS | 5 DAYS | DAY 1 | DAY 5 | | PROD MGR | |
| 9 | RISKS, ASSUMPTIONS, AND CONTINGENCIES | 5 DAYS | DAY 1 | DAY 5 | | PROD MGR | |
| 10 | APPENDICES | 5 DAYS | DAY 1 | DAY 5 | | PROD MGR | |
| 11 | ADVERTISING SCHEDULE | 5 DAYS | DAY 1 | DAY 5 | | PROD MGR | |
| 12 | RESOURCE GANTT CHART | 5 DAYS | DAY 1 | DAY 5 | | PROD MGR | |
| 13 | DISTRIBUTION CHANNEL MODEL | 5 DAYS | DAY 1 | DAY 5 | | PROD MGR | |

| ID | TASK NAME | DURATION | START | FINISH | PREDECESSORS | KEY RESOURCE | SUPPORT RESOURCE |
|---|---|---|---|---|---|---|---|
| 14 | TRADE SHOW SCHEDULE | 5 DAYS | DAY 1 | DAY 5 | | PROD MGR | |
| 15 | DEVELOP AND EXECUTE TARIFF/CUSTOMER CONTRACT | 133 DAYS | DAY 1 | DAY 133 | | PROD MGR | |
| 16 | DEVELOP COST DATA | 30 DAYS | DAY 62 | DAY 91 | | COSTING | |
| 17 | DEVELOP PRICING | 30 DAYS | DAY 92 | DAY 121 | DEVELOP COST DATA | PROD MGR | |
| 18 | UPDATE COSTS AND PRICING BASED ON MKT/OPS TRIAL RESULTS (IF REQ'D) | 5 DAYS | DAY 122 | DAY 126 | | PROD MGR | |
| 19 | COMPLETE LEAD LAWYER MEMO AND CHECKLIST REVIEW | 40 DAYS | DAY 1 | DAY 40 | | LEGAL | PROD MGR |
| 20 | REGULATORY ADVOCACY | 20 DAYS | DAY 114 | DAY 133 | | REG | PROD MGR |
| 21 | DEVELOP PLAN | 20 DAYS | DAY 114 | DAY 133 | | REG | PROD MGR |
| 22 | TARIFF DEVELOPMENT | 61 DAYS | DAY 67 | DAY 127 | | REG | |
| 23 | PREPARE TARIFF | 60 DAYS | DAY 67 | DAY 126 | | REG | PROD MGR |

*FIG. 24*

SYSTEMS, APPARATUS, AND METHODS FOR FACILITATING PRODUCT DEVELOPMENT

This is a division of application Ser. No. 10/233,660, filed Sep. 4, 2002, incorporated herein by reference.

FIELD OF THE INVENTION

The present invention relates to systems, apparatus, and methods for developing a product.

BACKGROUND OF THE INVENTION

Businesses use product development processes to create or modify their products. Product development requires coordination of several organizations in a business, such as operations, billing, engineering, sales, and customer support, to ensure that adequate resources and support are provided.

Unfortunately, coordination and administration of these organizations is difficult when developing products that involve services, such as telecommunications services. For example, known processes fail to identify when to engage the various organizations in a business as a product progresses through development. In addition, known processes fail to provide tools to these organizations, such as real-time on-line documentation associated with a product under development, templates for that documentation with on-line guidelines and definitions for completion, tracking reports for products under development, etc. Therefore, when a product is deployed, organizations in a business often cannot support the product.

Poor coordination and administration during product development leads to deployment problems and result in customer complaints or lost revenue. A business may also be forced to devote valuable resources (human and financial) to rework or correct these problems, Therefore, it would be desirable to provide systems, apparatus, and methods for developing a product, which overcome these and other shortcomings of known product development processes.

SUMMARY OF THE INVENTION

In accordance with the present invention, a method and apparatus are provided for developing a product. Information indicating a concept for a product is received. A plurality of features of the concept affecting respective organizations is then determined. Resources in the respective organizations are planned for implementing the concept as a product. The product is developed based on the planned resources, and then deployed.

In accordance with another aspect of the present invention, a system is provided for developing a product. At least one client provides information indicating a concept. A server receives the information indicating the concept and provides a set of templates for developing the concept into a product. The client then provides information for developing the product based on the set of templates.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles related to the invention.

FIG. 4 illustrates an example of a web page for a standardized form used to submit an idea or concept for a product, in accordance with the principles of the present invention;

FIGS. 11-14 illustrate examples of pipeline reports indicating the status of one or more products in development, in accordance with the principles of the present invention;

FIG. 15 illustrates an example of a web page for providing contact information for product review committee 104, in accordance with the principles of the present invention;

FIG. 19 shows an example of a template for a concept paper, in accordance with the principles of the present invention;

FIG. 20 shows an example of a template for screening matrix, in accordance with the principles of the present invention;

FIG. 21 shows an example of a template for a service description for service-type products, in accordance with the principles of the present invention;

FIGS. 22a-b show an example of a template for an opportunity assessment document, in accordance with the principles of the present invention;

FIGS. 23a-c shows an example of a template for a business case, which may be used in accordance with the principles of the present invention; and FIG. 24 shows an example of a template for a work plan, in accordance with the principles of the present invention.

DETAILED DESCRIPTION

Systems, apparatus, and methods are provided to facilitate product development by linking stages of product development with the allocation of resources and support for the product. Products are developed based on a structured framework having distinct stages in which each stage builds upon information of previous stages. For example, the structured framework may include distinct stages for assessing an initial concept for a products; analyzing the concept and defining a design for the product; developing plans based on the product design; developing the product based on the plans and conducting trials to test the product; launching and deploying the product; and managing the life cycle of the product after deployment. Each stage has defined objectives, team membership, roles and responsibilities, key activities, deliverables, and documentation. At the end of each stage, a review is conducted to determine whether the product is suitable for further development.

Upon each review, an integrated set of tools is used to identify and link the product with resources and support needed for the product. For example, tools are provided for real time on-line access to documentation associated with a product under development, templates for the documentation with on-line guidelines and definitions for completion, and tracking reports. In addition, the tools assist in automatically identifying the resources and support needed for the product as it progresses through each stage.

The following description of embodiments of this invention refers to the accompanying drawings. Where appropriate, the same reference numbers in different drawings refer to the same or similar elements.

Figure 1:
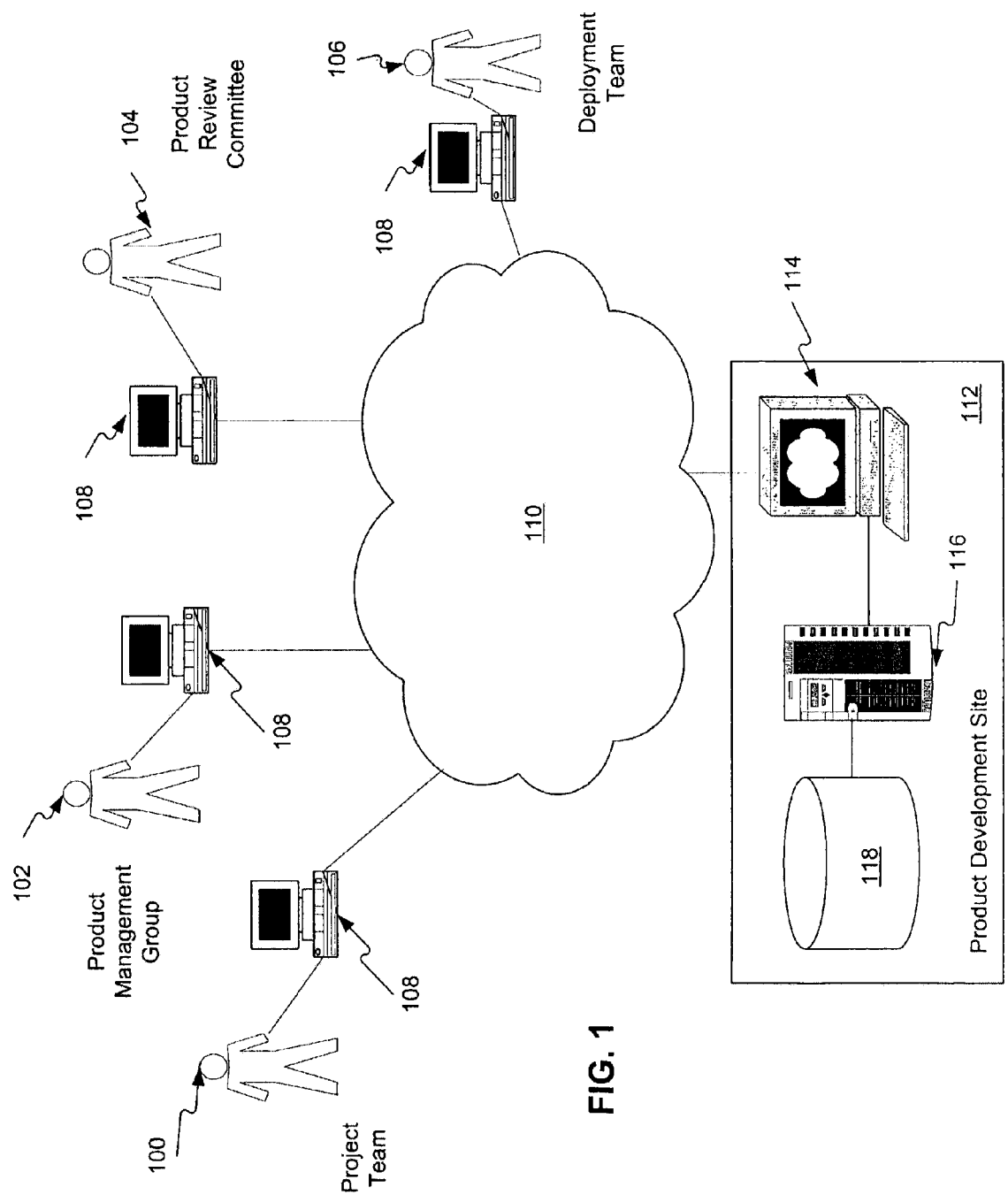
FIG. 1 illustrates an exemplary environment in which systems, apparatus, and methods for facilitating product development may be implemented consistent with the principles of the present invention.

FIG. 1 illustrates an exemplary environment in which systems, apparatus, and methods for facilitating product development may be implemented consistent with the principles of the present invention. As shown, various groups or entities may be involved with developing a product, such as a project team 100, a product management group 102, a product review committee 104, and a deployment team 106. Other groups, entities, or individuals also may be involved with developing a product.

Project team 100 comprises one or more individuals who plan and lead the work associated with developing a product. The individuals in project team 100 may represent the various organizations within the business, such as operations, engineering, finance, legal, marketing, information systems, customer support, etc. that are required to support the product. The structure and makeup of project team 100 may be customized to meet the specific needs of a particular stage of product development.

Product management group 102 comprises one or more individuals who supervise the activities of project team 100 for a particular line of business. A line of business is a portion of a business associated with a category of customers, such as consumer, wholesale, and enterprise.

Product review committee 104 comprises one or more individuals who review product development for an entire business. For example, in one embodiment, product review committee 104 comprises executive-level individuals from each of the various organizations in the business.

In addition, product review committee 104 may assist in resolving issues discovered by product management group 102. For example, product review committee 104 may assist in resolving issues regarding funding, or whether to implement new technology within the business.

Deployment team 106 comprises one or more individuals who plan and lead the work associated with implementing and deploying a product based on the work of project team 100. For example, deployment team 106 may perform work, such as training, sales, installations, marketing, and customer support.

Each of the groups may share information using one or more client computers, such as client 108, to access product development site 112 over network 110. Client 108 may be any device capable accessing network. For example, client 108 may include a personal computer having a browser, such as Internet Explorer or Netscape Navigator.

Although each group is shown having its own client, any number of clients may be provided. For example, each individual within a team may have his own client. Alternatively, individuals or teams may share one or more clients.

Network 110 provides a communications infrastructure for sharing information between the various groups and product development site 112. Network 110 may be implemented as a wide area network, a local area network, or a combination of multiple networks. Network 110 may support various protocols, such as Internet Protocol, Ethernet, Frame Relay, or Asynchronous Transfer Mode. Network 110 may be a public network, such as the Internet, or a private network, such as a corporate intranet. Other network configurations are also consistent with the principles of the present invention.

Product development site 112 provides a central location for sharing product development information between groups, such as project team 100, product management group 102, product review committee 104, and deployment team 106. For example, in one embodiment, product development site 112 is implemented as a web-site using known protocols, such as Hypertext Transport Protocol and File Transfer Protocol.

In particular, product development site 112 may include a web server 114, a database server 116, and a database 118. Web server 114 serves information to client 108 to provide access to real-time on-line documentation associated with a product under development, templates for the documentation with on-line guidelines and definitions for completion, and tracking reports for products under development.

Web server 114 may also support requests for reports tracking products under development. For example, web server 114 may operate in conjunction with database server 116 to create reports that indicate the status of all products currently under development or the status of one or more selected products. The reports may be sorted by category, stage of development, or by a specific line of business. Other types of reports are also consistent with the principles of the present invention.

Database server 116 services requests for information stored in database 118 from web server 114. For example, database server 116 may retrieve information from database 118 using Structured Query Language queries. Database server 116 may be implemented using known combinations of hardware and software.

Database 118 provides storage for product development information. Database server 116 and database 118 may be implemented using known formats, such as Lotus Notes or Oracle.

Figure 2:
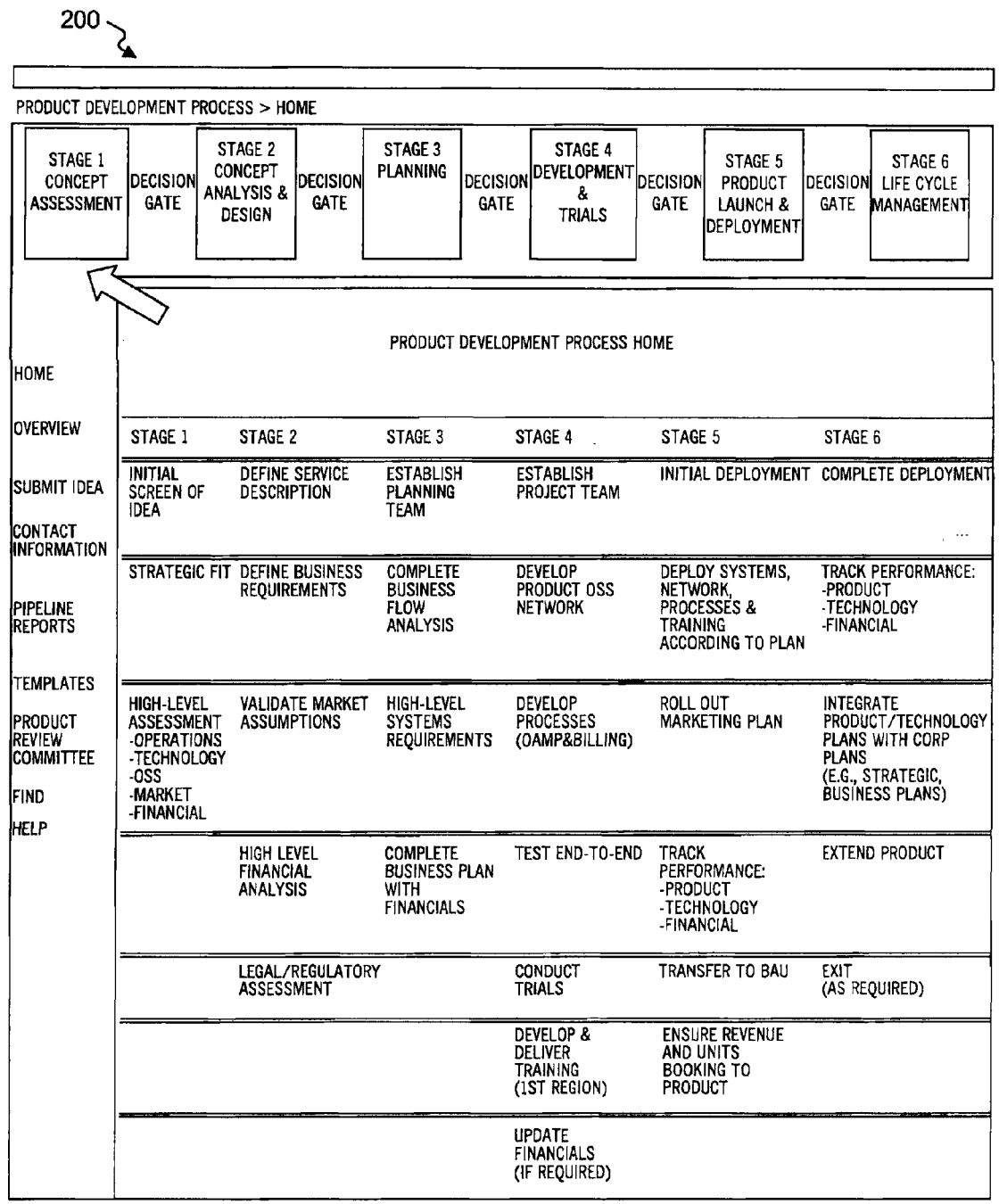
FIG. 2 shows an initial home page 200 provided by product development site 112, in accordance with the principles of the present invention.

FIGS. 2-17 illustrate various examples of web pages provided by product development site 112, in accordance with the principles of the present invention. FIG. 2 shows an initial home page 200 provided by product development site 112, in accordance with the principles of the present invention. As shown, home page 200 provides links for each stage of product development. Although the links for each stage are displayed horizontally along the top of home page 200, other formats may be used consistent with the principles of the present invention.

In addition, home page 200 provides links for various types of information. For example, as shown in FIG. 2, home page 200 provides: a "Home" link for returning to home page 200;

an "Overview" link to point to an initial page for a particular stage; a "Submit Idea" link to retrieve a standardized form for submitting an idea for a product; a "Contact Information" link to retrieve contact information, such as phone numbers and e-mail addresses, of various individuals or teams; a "Pipeline Reports" link to retrieve various reports regarding the status of one or more products in development; a "Templates" link to retrieve templates for documents for each particular stage; a "Product Review Committee" link to obtain contact information for product review committee 104; a "Find" link to access a search tool provided by product development site 112; and a "Help" link to provide help information for product development site 112.

Figure 3:
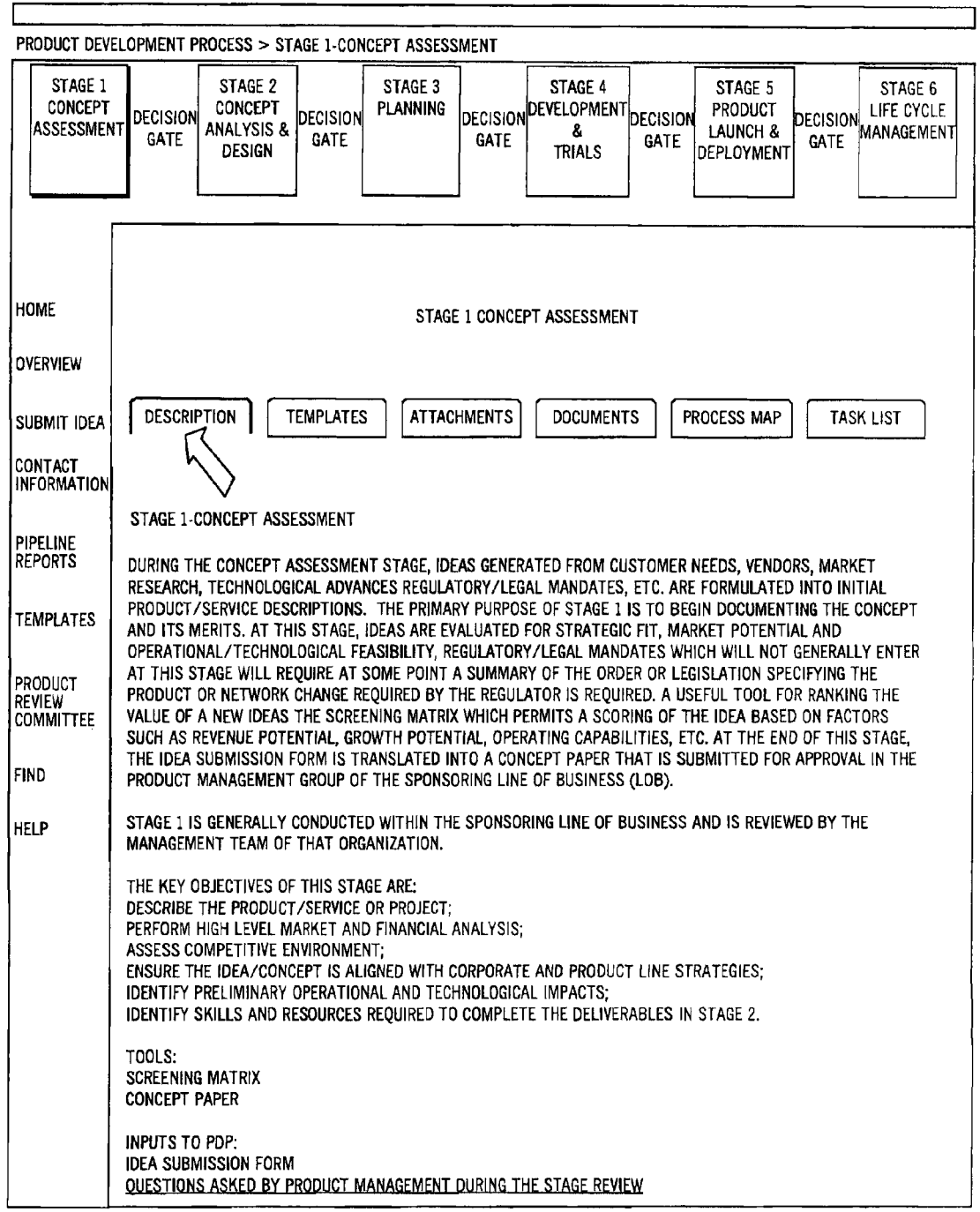
FIG. 3 illustrates an example of an overview page for a particular stage of product development, in accordance with the principles of the present invention.

FIG. 3 illustrates an example of an overview page 300 for a particular stage of product development, in accordance with the principles of the present invention. As shown in FIG. 3, overview page 300 is provided for "Stage 1 Concept Assessment." Overview page 300 is further includes tabs for linking to other information. In particular, overview page 300 is shown with tabs for a "Description"; "Templates"; "Attachments"; "Documents"; a "Process Map"; and a "Task List". The "Description" tab links to information, which describes the definition and scope of a stage, required inputs, tasks associated with a stage, and objectives of the stage. The "Templates" tab links to templates for documents associated with a stage. The "Attachments" tab links to information, which may be attached to documents previously submitted for a stage. The "Documents" tab links to previously submitted documents, such as those submitted by project team 100, for a stage. The "Process Map" tab links to a detailed process map for a stage. The "Task List" provides a list of various organizations responsible for each aspect of a product.

FIG. 4 illustrates an example of a web page for a standardized form used to submit an idea or concept for a product, in accordance with the principles of the present invention. As shown in FIG. 4, a standardized form 400 may be used to submit an idea or concept for a product. The standardized form 400 may include various fields for describing the source of the idea or concept; the proposed features and functionality associated with the idea or concept; the customer's needs, wants, or desires that are addressed by the idea or concept; the target customers for the idea or concept; the benefits of the idea to the business or line of business; the potential risks of the idea or concept; the operating and technological requirements of the idea or concept; and any miscellaneous information. Other fields and information may also be requested in standardized form 300.

Figure 5:
FIG. 5 illustrates an example of web page for retrieving templates associated with product development, in accordance with the principles of the present invention.

FIG. 5 illustrates an example of web page for retrieving templates associated with product development, in accordance with the principles of the present invention. For example, product development site 112 may provide templates for submitting ideas, a concept paper, a screening matrix, a service description, an opportunity assessment, a project work plan, a request for legal review, a checklist for assessing legal issues, a business base narrative with financial worksheet, a business planning document, a resource commitment form, presentations, a project work plan, a checklist for assessing market readiness, and an exit plan for terminating a product.

Figure 6:
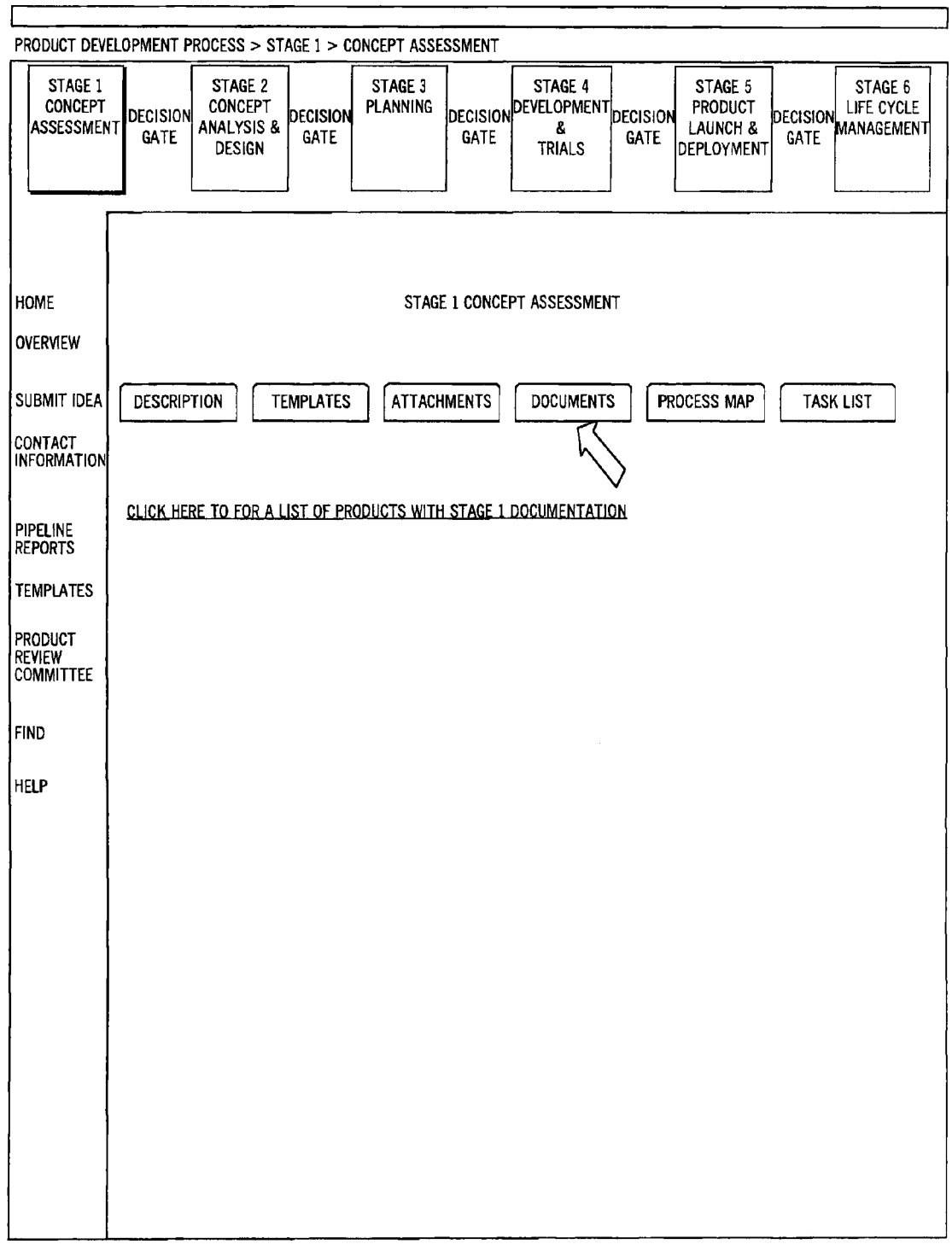
FIG. 6 illustrates an example of a web page providing links for on-line access to documents previously submitted for a particular stage, in accordance with the principles of the present invention.

FIG. 6 illustrates an example of a web page providing links for on-line access to documents previously submitted for a particular stage, in accordance with the principles of the present invention. For example, when project team 100 submits a document to product development site 112, various links may be provided by web server 114 to allow real-time on-line access to these documents.

Figure 7:
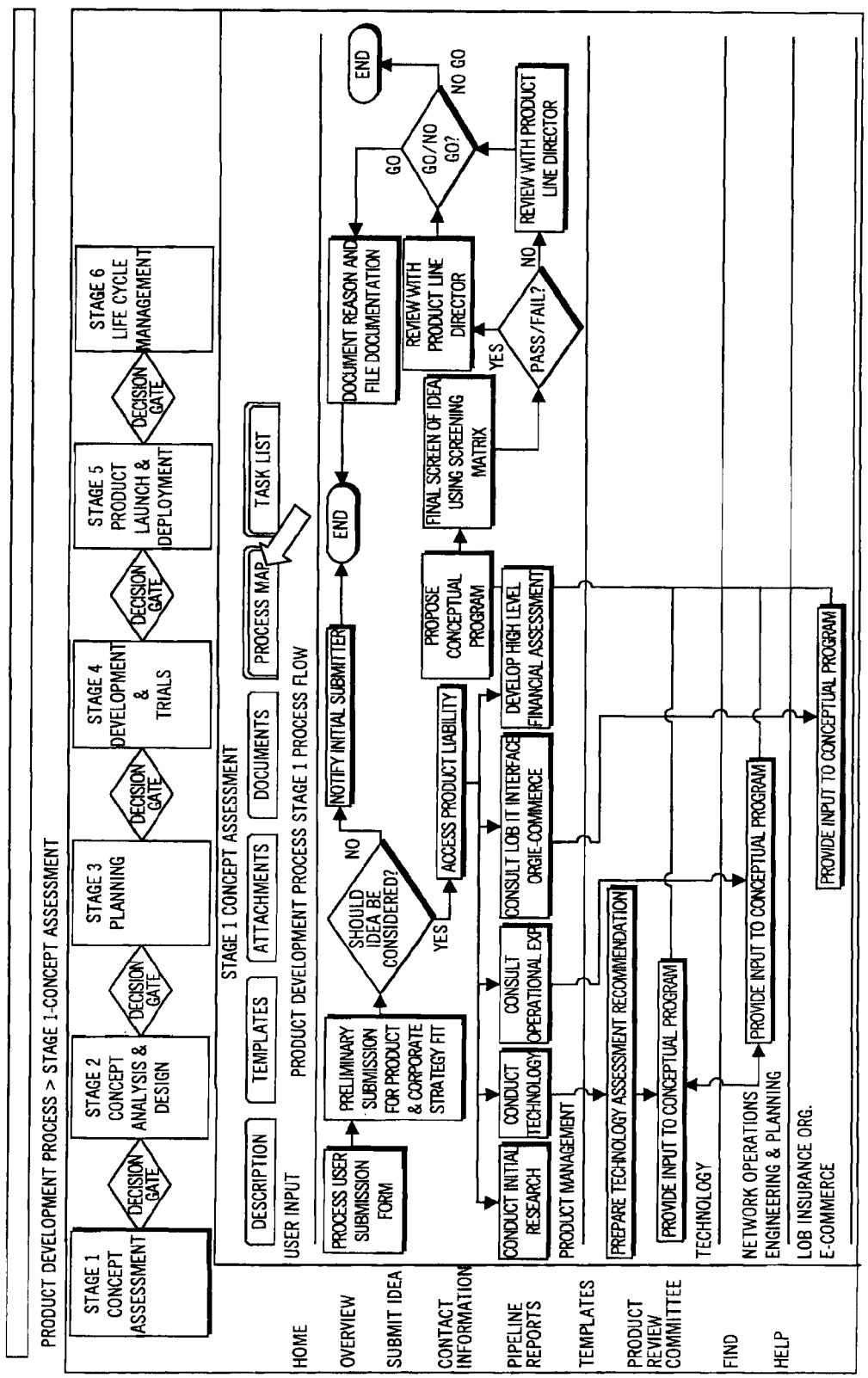
FIG. 7 illustrates an example of a web page for providing a process map, in accordance with the principles of the present invention.

FIG. 7 illustrates an example of a web page for providing a process map, in accordance with the principles of the present invention. As shown in FIG. 7, a process map 700 indicates a specific process for developing a product unique to a particular stage. Other types of process maps may also be used.

Figure 8:
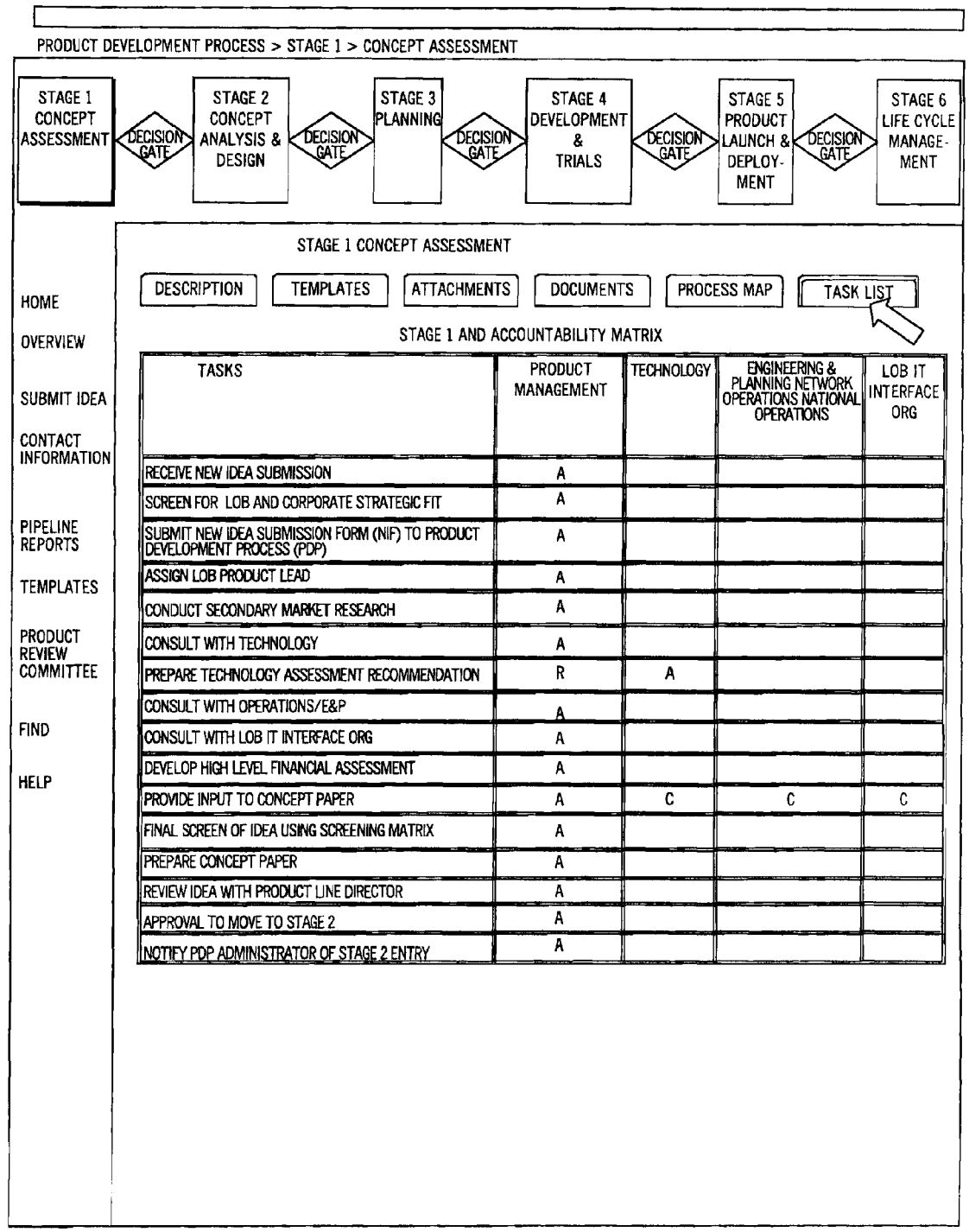
FIG. 8 illustrates an example of a web page providing a task list, in accordance with the principles of the present invention.

FIG. 8 illustrates an example of a web page providing a task list, in accordance with the principles of the present invention. As shown in FIG. 8, a task list 800 indicates the various organizations within a business and their respective responsibilities for a product under development.

Figure 9:
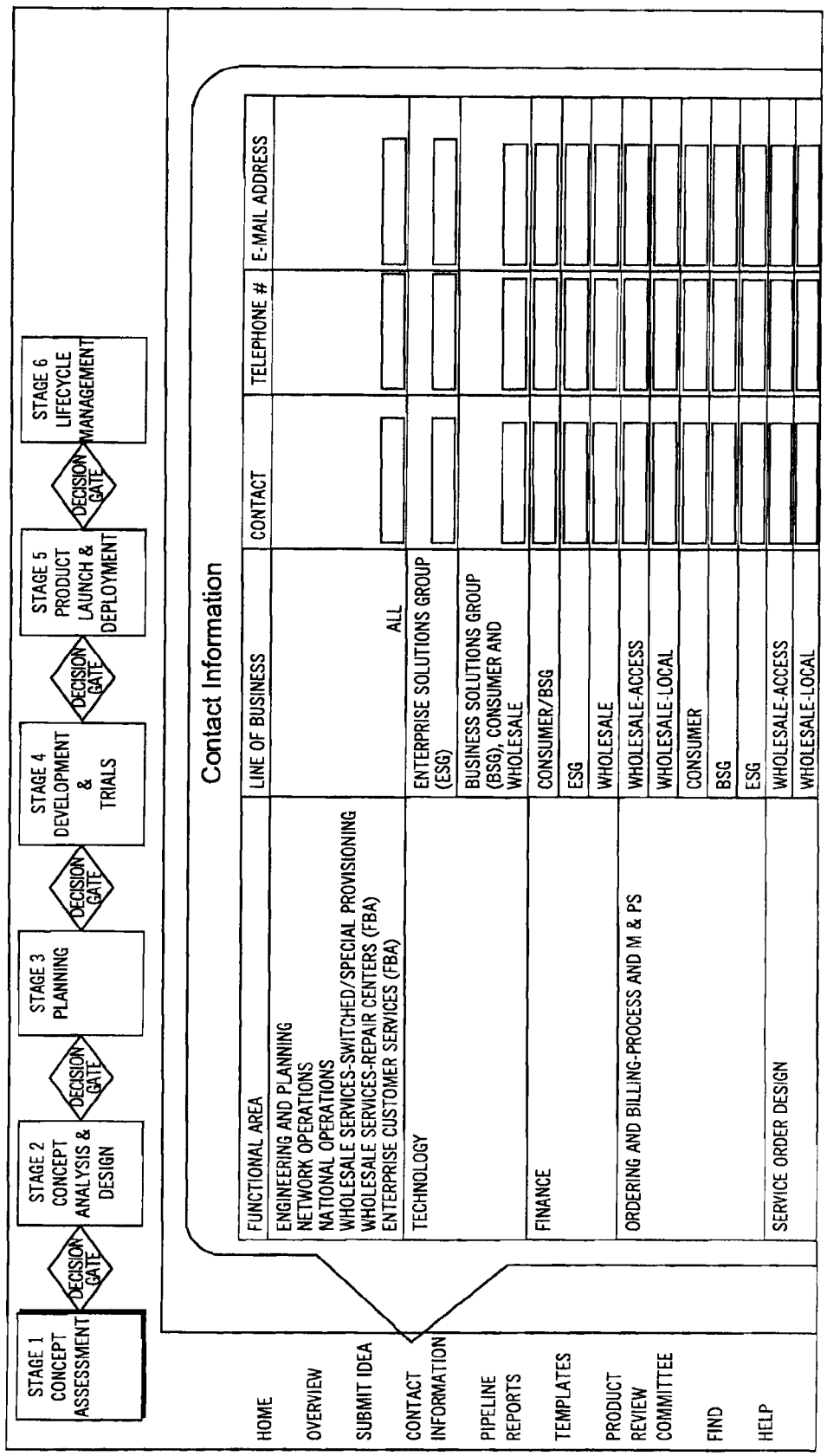
FIGS. 9 and 10 illustrate examples of web pages including contact information, in accordance with the principles of the present invention.
Figure 10:
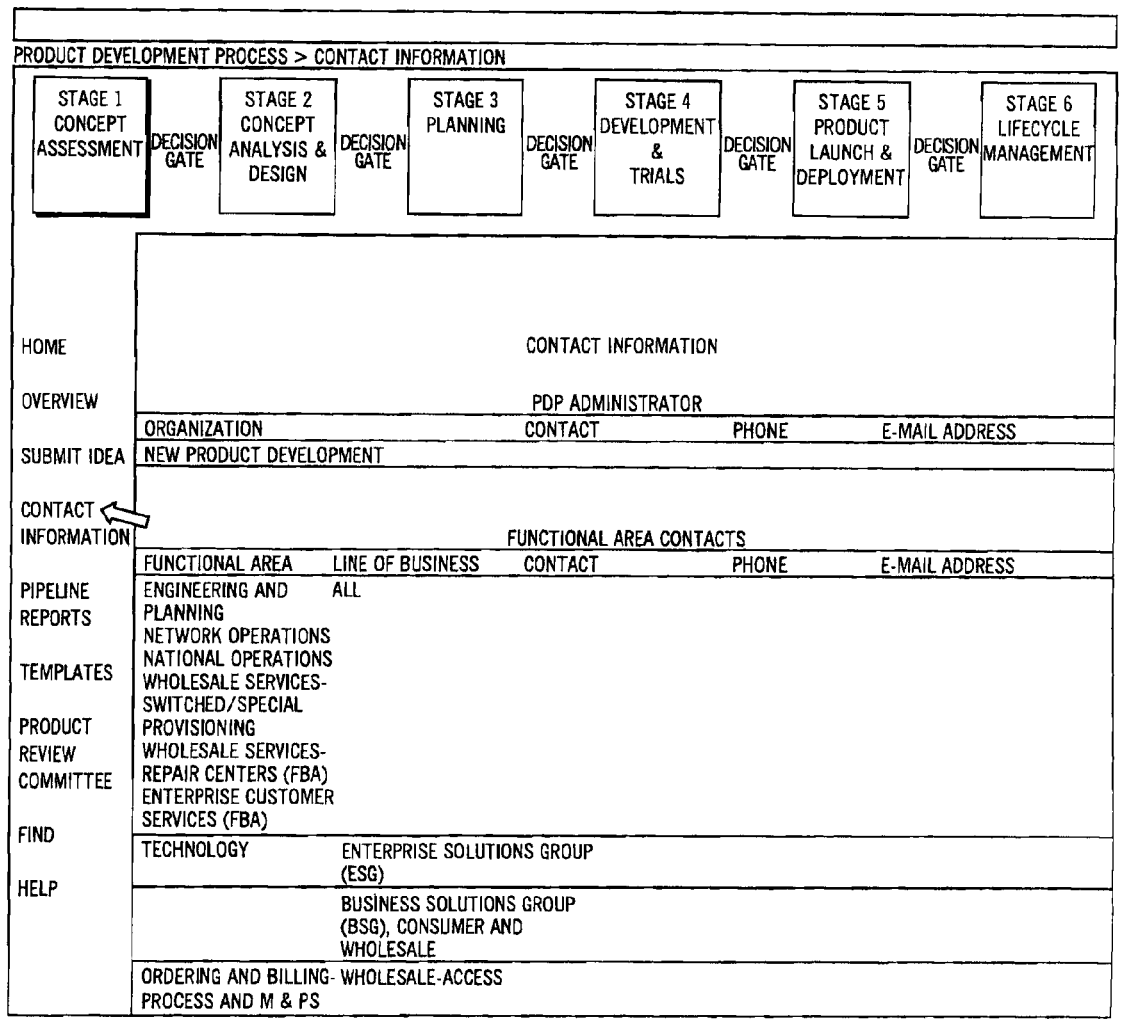
Figure 11:
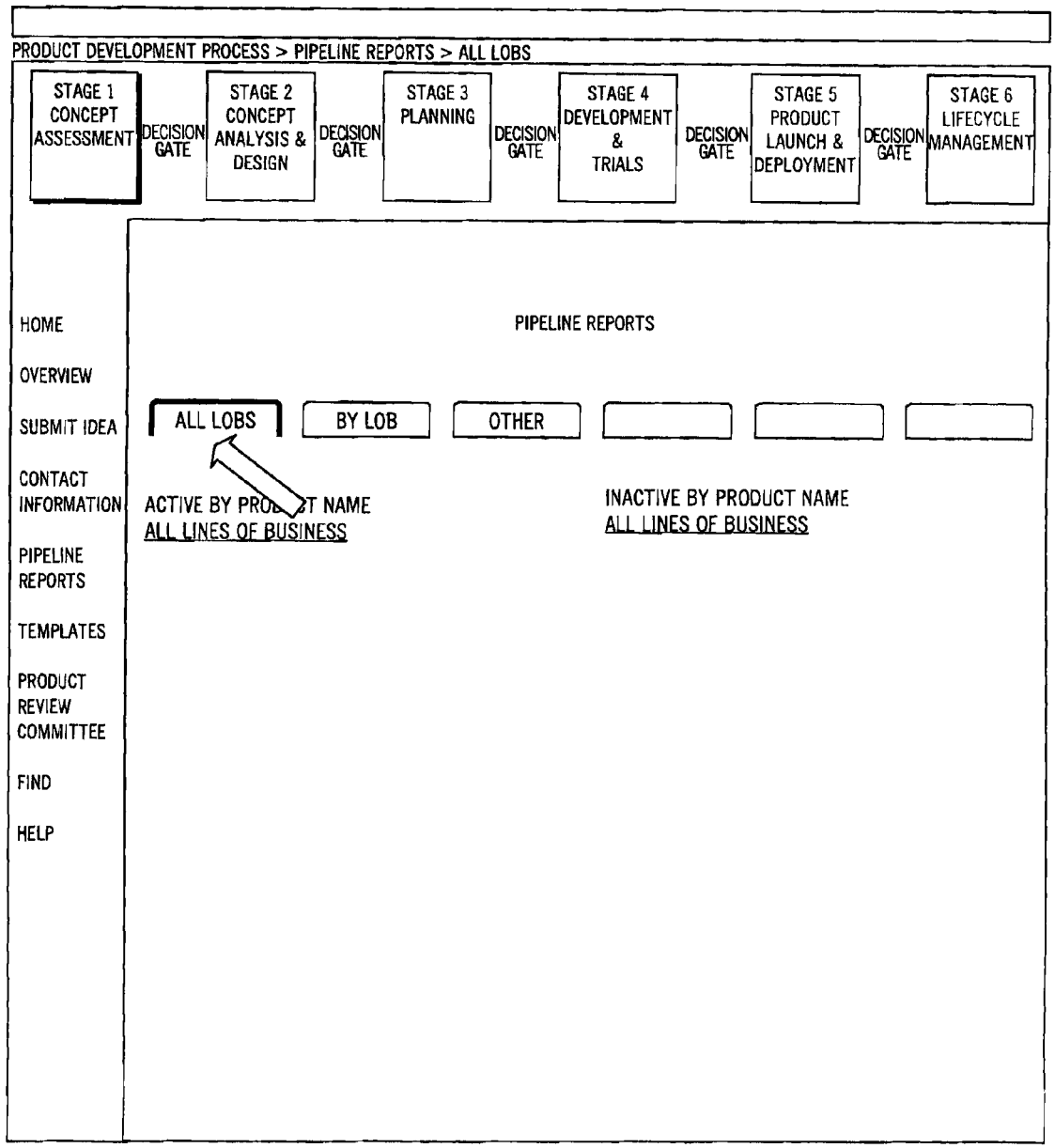
Figure 12:
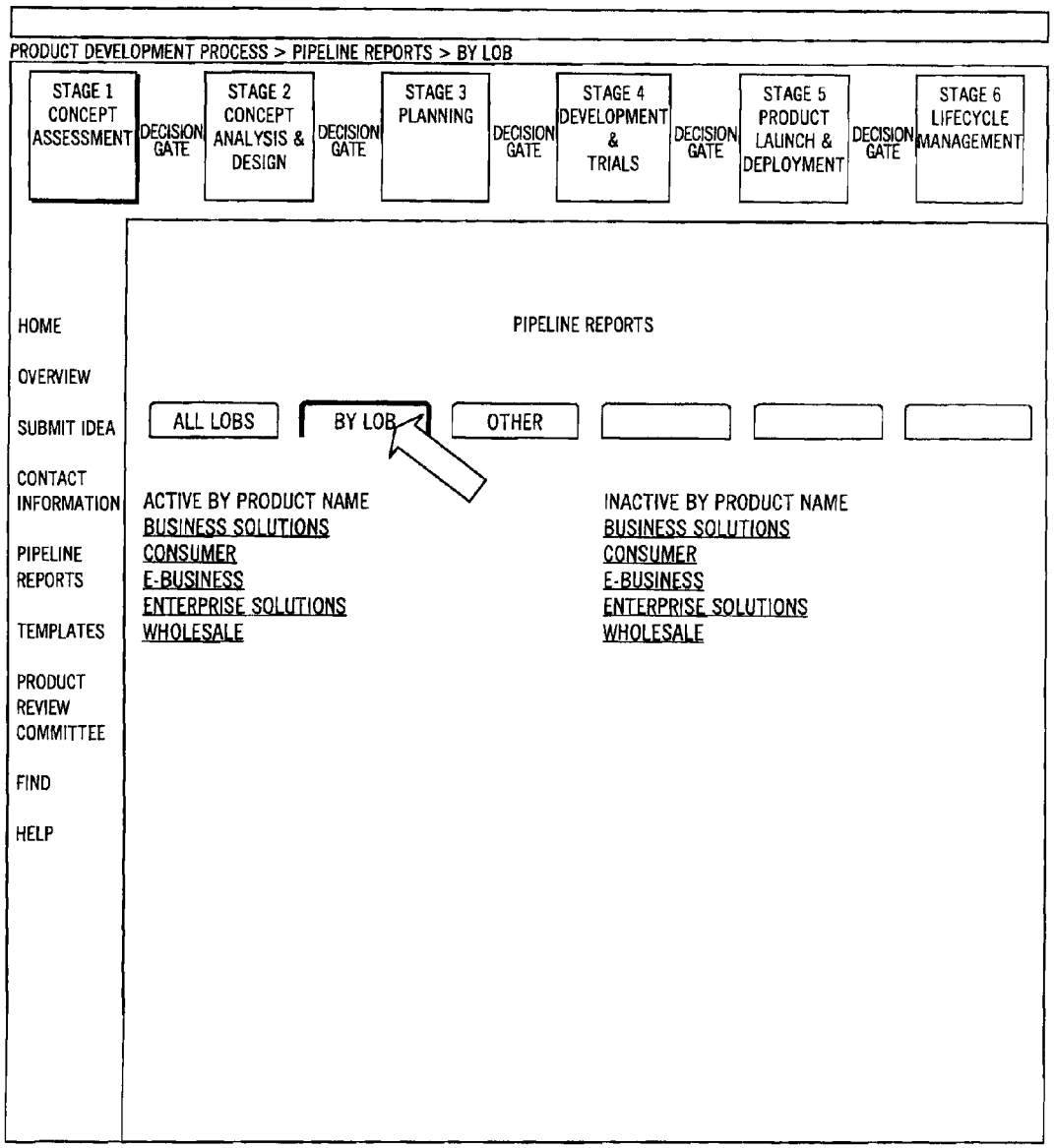

FIGS. 9 and 10 illustrate examples of web pages including contact information, which is used by product development site 112, in accordance with the principles of the present invention. The contact information allows product development site 112 to identify individuals, such as individuals serving on project team 100, product management group 102, product review committee 104, and deployment team 106. In addition, product development site 112 may provide contact information upon request such that an individual may determine how to contact another individual. FIGS. 11-14 illustrate examples of pipeline reports indicating the status of one or more products in development, in accordance with the principles of the present invention. Pipeline reports may be any type of report that indicates the status of one or more products in development and may be presented in a variety of formats. For example, FIG. 11 shows a pipeline report indicating the status of products for all lines of business. FIG. 12 shows a pipeline report indicating the status of products for a particular line of business. FIG. 13 shows a pipeline report illustrating the status of products for all lines of business based on stages of the product development process and line of business. FIG. 14 shows a pipeline report illustrating the status of inactive products for all lines of business.

Figure 16:
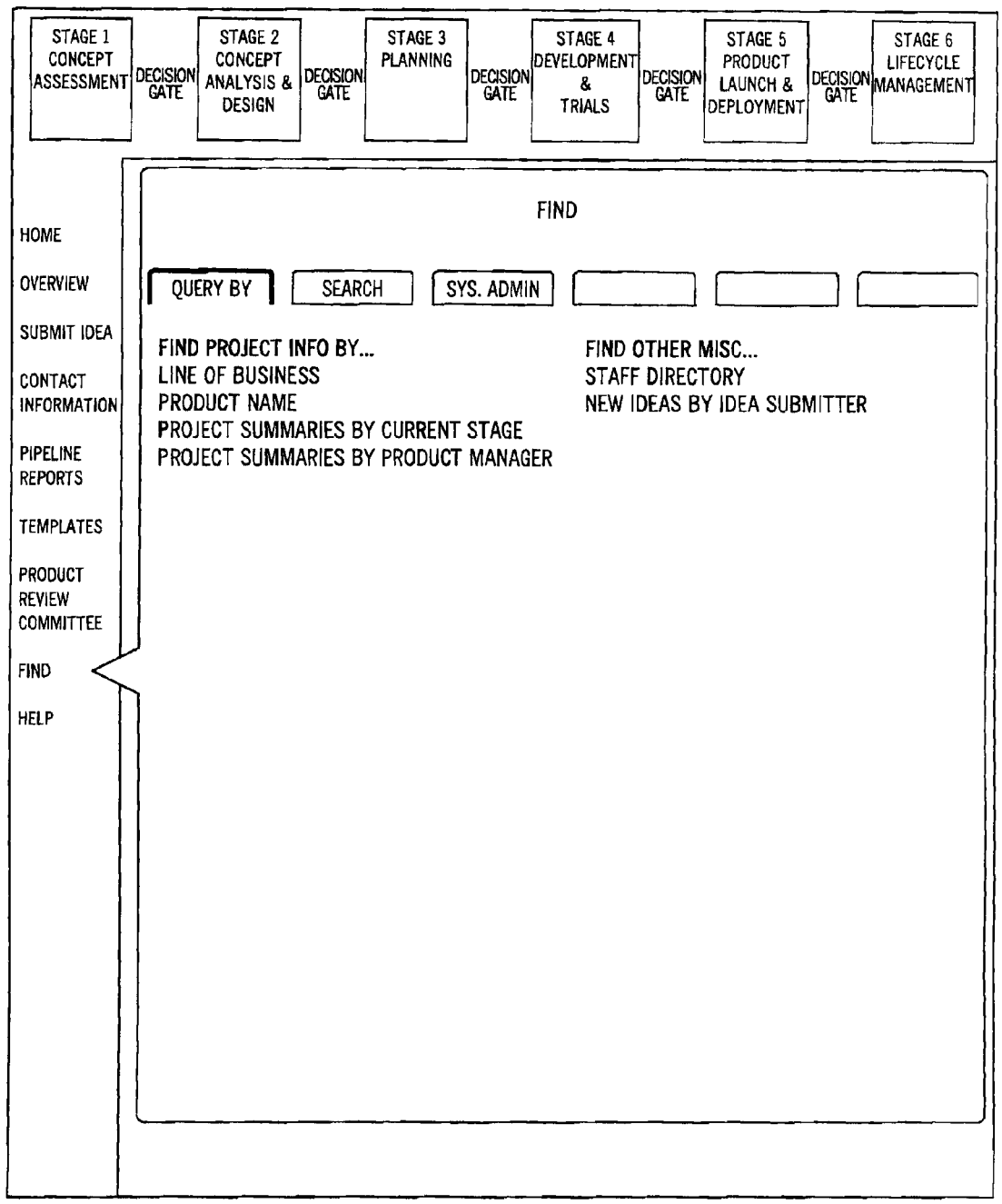
FIG. 16 illustrates an example of a search tool provided by the product development site, in accordance with the principles of the present invention.
Figure 17:
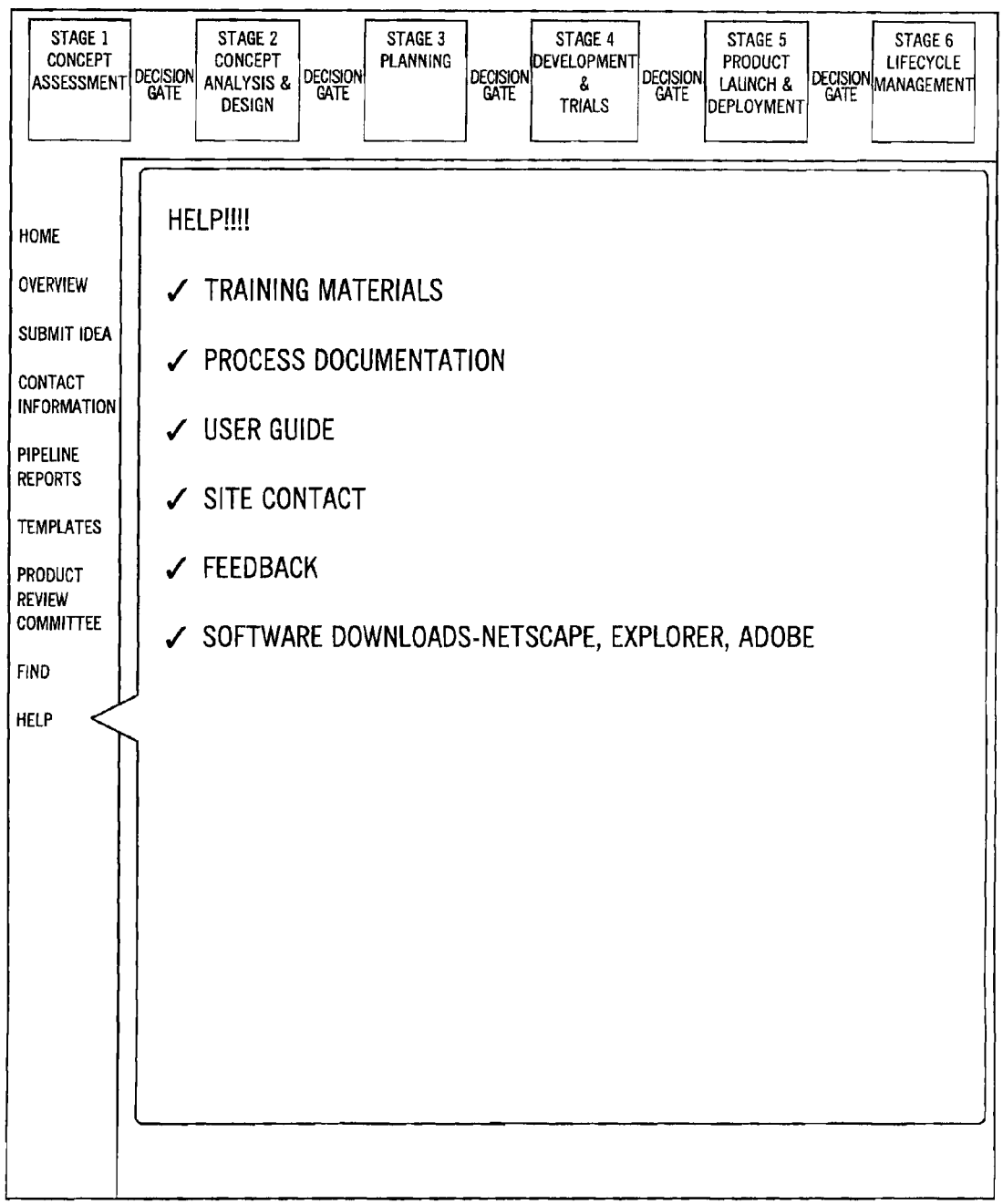
FIG. 17 illustrates examples of help information provided by the product development site, in accordance with the principles of the present invention.

FIG. 15 illustrates an example of a web page providing contact information for product review committee 104, in accordance with the principles of the present invention. FIG. 16 illustrates an example of a search tool provided by product development site 112, in accordance with the principles of the present invention. The search tool allows an individual accessing product development site 112 to find and retrieve information, for example, related to one or more products. For example, the search tool may allow an individual to search for information based on one or more key words or phrases. Other types of search tools are also consistent with the principles of the present invention. FIG. 17 illustrates examples of help information provided by product development site 112, in accordance with the principles of the present invention. The help information may be any information which assists an individual. For example, the help information may include instructions on how to complete a template, a glossary of terms commonly used by the business, and information describing how to use one or more of the tools provided by provided by product development site 112. Other types of help information, such as links to websites, may also be provided by product development site 112.

Figure 18:
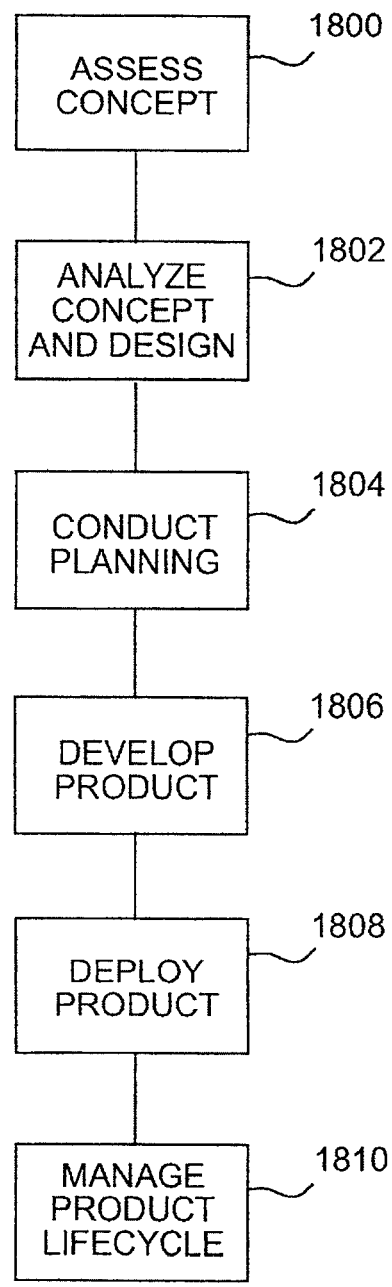
FIG. 18 illustrates the stages for developing a product, in accordance with the principles of the present invention.

FIG. 18 illustrates the stages for developing a product, in accordance with the principles of the present invention. In one embodiment, a product is developed based on a structured framework having six stages. Stages are provided for assessing an initial concept for a product; analyzing the concept and defining a design for the product; developing plans based on the product design; developing the product based on the plans and conducting trials to test the product; launching and deploying the product; and managing the life cycle of the product after deployment.

Typically, each stage has defined objectives, team membership, roles and responsibilities, key activities, deliverables, and documentation. At the end of each stage, a review is conducted to determine whether the product is suitable for further development. In addition, when the review is conducted, resources and support are identified and allocated for the product using the tools provided by product development site 112.

In stage 1800, project team 100 assesses a concept for a product. Project team 100 may formulate the concept based on information indicating customer needs, information from vendors, market research, technological advances, regulatory/legal mandates, etc.

For example, project team 100 may use standardized form 300 to initially describe the concept for a product. The description of the concept may then be downloaded from product development site 112. One or more individuals from project team 100 may complete information in standardized form 300 and submit it to product development site 112.

Project team 100 may also provide a document describing how the concept results in a desirable product For example, project team 100 may use a template for a "concept paper," which is downloaded from product development site 112.

FIG. 19 shows an example of a template for a concept paper, in accordance with the principles of the present invention. As shown in FIG. 19, the concept paper may include sections for administrative information; information describing the concept; an assessment of the market; information describing the customer requirements; information describing the competitive situation; and a strategic assessment. Although the concept paper is limited in length to say five pages, concept papers of other lengths and format may also be used.

In addition to the concept paper, project team 100 may assign a rank or score to the product concept. Project team 100 may use a "screening matrix" to assign or score the product, based on a template downloaded from product development site 112.

FIG. 20 shows an example of a template for a screening matrix, in accordance with the principles of the present invention. As shown in FIG. 20, the screening matrix may include sections for factors, such as revenue potential, market share potential, competitive environment, growth potential, pricing, how the product concept may be differentiated from other products, customer value or need, how the product concept fits within a particular product line, how the product concept fits within a particular platform, operating capabilities of the business, and legal or regulatory issues.

Using client 108, project team 100 may then provide standardized form 300, the concept paper, and screening matrix to product development site 112. Product development site 112 may then store this information in database 118 and notify product management group 102 that new information for assessing a concept has been received from project team 100. For example, product development site 112 may refer to contact information, such as the contact information illustrated in FIGS. 9 and 10, to send an e-mail to product management group 102.

Product management group 102 then receives the notification via client 108 and retrieves the information from product development site 112. Product management group 102 reviews this information to determine whether to proceed with developing a product based on the concept. In determining whether to proceed, product management group 102 may consider: whether the concept represents a significant return or opportunity for the business; whether the concept fits within the strategy of the business; the size and expected growth of a product resulting from the concept; whether the business can be a market leader or obtain significant market share; whether the customer benefits are compelling; any barriers associated with introducing or terminating the product resulting from the concept; whether the product resulting from the concept fits within the operations of the business; whether technology exists to support the concept; whether any legal or regulatory issues are associated with the concept; the relative ranking of the concept versus other concepts; and/or the risks associated with introducing a product resulting from the concept.

In addition, product management group 108 may also consider: whether the product resulting from the concept requires a new platform or infrastructure for deployment; whether an existing platform of technology supported by the business must be replaced; how the product resulting from the product is differentiated from existing products; how the business' strategy is supported and extended by the product resulting from the concept; whether there any standards or marketing issues related to the product resulting from the concept; whether there are significant customers, who have expressed interest in the concept; and/or whether any joint ventures or alliances are involved with the concept.

After reviewing the information for assessing a concept, product management group 102 may provide its decision to product development site 112. Product development site 112 may then notify project team 100. Status information may also be updated in database 118. For example, if the concept was approved for further development, one or more individuals of project team 100 may modify information in database 118 to indicate an updated status for the product.

Referring now to FIG. 18, in stage 1802, project team 100 conducts further analysis of the concept and begins designing a product based on the concept. For example, for service-type products, project team 100 may draft a "service description" document and "opportunity assessment" document based on templates from product development site 112.

FIG. 21 shows an example of a template for a service description for service-type products, in accordance with the principles of the present invention. As shown in FIG. 21, the service description includes information describing: the various scenarios and environment in which the service will be provided; how the service affects revenue; a forecast and analysis of anticipated revenues, costs, and expenses; who will use the service; an analysis of easy it will be to use the service and access the broadest range of customers; an assessment of the technology (hardware and software) and infrastructure, such as network capacity, required to support the service; plans, such as project plans; trial, such as operational or marketing trials; an anticipated date for deploying the service; an analysis of the risk if the service is offered, not offered, or delayed; and a description of the regulatory and legal issues. In addition, project team 100 may provide associated attachments, such as technical information from vendors, a glossary of any terms that require further definition, and various figures and drawings, such as schematics.

In addition to the service description, project team 100 may prepare an "opportunity assessment." The opportunity assessment document provides a high-level business plan for the concept and is based on various assumptions selected by project team 100. Project team 100 may select the assumptions, for example, based on research or instructions from product management group 102.

FIGS. 22*a-b* show an example of a template for an opportunity assessment document, in accordance with the principles of the present invention. As shown in FIGS. 22*a-b*, the opportunity assessment includes information indicating the background of the concept, an analysis of the concept, conclusions reached by project team 100, and recommendations of project team 100.

Project team 100 then provides the service description and opportunity assessment to product development site 112. Product development site 112 then notifies product management group 102 by, for example, e-mail.

Product management group 102 then retrieves and reviews the information and determines whether to proceed with planning for the product. In determining whether to proceed, product management group 102 may consider: whether the business can derive significant returns; whether the preliminary financial information appears realistic; how the product fits within the strategy for the business; what is the key factor, such as software, network design, superior systems, etc., to the value of the product; whether there are alternatives to the product; whether the business can be a market leader or obtain significant market share; who is competition in the market; what are the links to current products or whether the product is a substitute or replacement for a current product; what are the resale implications for the product; whether the target market is sizable and whether the size and growth assumptions are realistic; whether the customer benefits are compelling and can they be easily communicated; whether there are any boundaries, such as a specific time frame, associated with the product; how will the business overcome any barriers to introducing the product and how the barriers affect the competitors; what are the technology dependencies of the product; whether the business must modify its operations to deploy the product; which line of business will own and manage the product; what are the roles of outside partners or vendors; whether the legal and regulatory environment is favorable to the product; what is the role of mergers, joint ventures, and alliances; what are the risks associated with introducing the product and whether there is a way to mitigate the risks; whether there are significant risks in failure or termination of the product; and/or whether the resources proposed for the next stage are appropriate and available.

Upon determining whether to proceed, product management group 102 may also identify one or more resources to supplement project team 100. For example, product management group 102 may retrieve one or more pipeline reports, such as those shown in FIGS. 11-14, or refer to contact information, such as the information shown in FIGS. 9 and 10, to determine whether additional resources must be allocated to project team 100. Other information provided by product development site 112 may also be checked, such as the task list shown in FIG. 8, to identify the resources needed.

Referring now to FIG. 18, in stage 1804, project team 100 defines the business, functional, and technological requirements for planning and implementing the proposed product and develops a document describing the business case with financial analysis for the proposed product. For example, the business, function, and technological requirements may include information regarding the sales process, order entry, order processing, customer support, billing, maintenance, and management responsibility and reporting.

In order to assist planning and implementation, project team 100 may develop a project plan and timetables, conduct market and competitive assessments, further refine the service description, address the legal and regulatory issues, determine pricing and costs, create a marketing plan, and determine the technical feasibility of the product.

For example, project team 100 may draft a "business case" with financial analysis. The business case with financial analysis may be developed based on a template provided from product development site 112.

FIGS. 23*a-c* show an example of a template for a business case, in accordance with the principles of the present invention. As shown in FIGS. 23*a-c*, the business case includes a detailed description, analysis, and evaluation of the business opportunity associated with the proposed product. For example, the business case may include sections describing: the business opportunity addressed by the proposed product, the background of the project for the proposed product: the persons and organization responsible for the project; an assessment of the market for the proposed product; an assessment of the competitive environment; the legal and regulatory requirements for the proposed product; a time table for deploying the proposed product; an assessment of the risks associated with implementing and not implementing the proposed product; the strategies associated with entering the market for the proposed product and exiting the market if the proposed product is not successful; alternatives to the proposed product; and a financial analysis of the proposed product. Project team 100 may use a variety of known financial models to conduct a financial analysis for the business case. Project team 100 then provides the business, functional, and technological requirements and the business case to product management group 102 via product development site 112.

Product management group 102 then retrieves the information from product development site 112, reviews this information and provide its comments and recommendations to product review committee 104 via product development site 112. Product review committee 104 also reviews the information and notifies the organizations, such as engineering, operations, sales, marketing, customer support, etc. affected by the proposed product. For example, product review committee 104 may submit a request to product development site 112 to notify the organizations affected by the proposed product. Alternatively, upon receiving approval from product review committee 104, product development site 112 may automatically notify the affected organizations by, for example, e-mail.

In the notification, product review committee 104 may request that the affected organizations identify resources, such as personnel or funding, that will be assigned or committed to the proposed product. The affected organizations may then identify to product development site 112 resources that are committed to the proposed product by, for example, filling out a resource commitment form. Once product development site 112 receives the assignments or commitments from the affected organizations, product review committee 104 is notified by product development site 112. Product review committee 104 then gives permission to project team 100 to proceed with developing the proposed product in the next stage.

In stage 1806, project team 100 assembles the assigned resources from the affected organizations to develop the proposed product. For example, project team 100 may develop an architecture (hardware or software) for the product, identify infrastructure needed to support the product, identify platforms needed to support the product, etc. Project team 100 may consult with outside vendors for various components of the product and design various trials for testing the product. Project team 100 may also develop training materials for the affected organizations, and determine pricing.

Project team 100 may then conduct various trials to verify that the product meets certain requirements, such as customer requirements. In addition, project team 100 may use trials to ensure that the product can be supported by the business. For example, the trials may test whether the business can adequately process orders, bill, monitor the product, and/or maintain the product. Moreover, the trials may confirm whether the business case was accurate. At the end of trials, project team 100 compiles the results and provides them to product development site 112. Product review committee 104 and product management group 102 then retrieve the information from product development site 112 and determine whether to deploy and implement the product based on the results of the trials. Upon receiving approval for deploying and implementing the product from product review committee 104 and product management group 102, product development site may then notify project team 100 and deployment team 106.

Referring now to FIG. 18, in stage 1808, deployment team 106 deploys and implements the product. For example, deployment team 106 may complete installation of hardware and software, finalize product documentation, finalize pricing, and define metrics for monitoring the success of the product. Deployment team 106 may deploy and implement the product based on a work plan developed with project team 100 and based on a template downloaded from product development site 112. FIG. 24 shows an example of a template for a work plan, in accordance with the principles of the present invention. As shown in FIG. 24, the product work plan may comprise columns indicating an identifier for each task; a name for each task; a duration for each task; a start date; a finish date; a condition or predecessor for each task; one or more resources that are key or critical to each task; and one or more resources that are required to support or complete each task.

During deployment and implementation, deployment team 106 may report the progress of the product to product development site 112. For example, deployment team 106 may report how the product is performing relative to its metrics, how product is performing relative to customer requirements and expectations, how the competition has reacted to the product, and any technical issues. Product development site 112 may provide this status information to, for example, product review committee 104 or product management group 102 using the pipeline reports illustrated in FIGS. 11-14.

Referring now to FIG. 18, in stage 1810, product management group 102 continues to manage the deployment of the product. For example, based on the status information and reports provided from deployment team 106, product management group 102 may develop new ideas for enhancements or new products and may reenter the product development process at stage 1800. Product management group 102 may manage the product based on the anticipated "lifecycles" of growth, maturity, and decline. Product management group 102 may then provide this information to product review committee 104 so that the business can incorporate the information into its strategy and account for the anticipated lifecycle of the product.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for facilitating the development of a product, comprising steps implemented by one or more computers of:

providing, by a product development site, a home page over a network, the home page including a plurality of links to overview pages corresponding to stages of product development, the stages including at least a concept stage, a design stage subsequent to the concept stage, a planning stage subsequent to the design stage, and one or more stages subsequent to the planning stage, the overview pages including at least a concept stage overview page, a design stage overview page, and a planning stage overview page;

storing, in a database, a plurality of concept stage document templates comprising at least a concept template and a concept screening template associated with the concept stage, a plurality of design stage document templates comprising a service description template and opportunity assessment template associated with the design stage, and a planning stage document template associated with the planning stage;

providing, by the product development site comprising a web server, electronic access to the plurality of concept stage document templates through the concept stage overview page, to the plurality of design stage document templates through the design stage overview page, and to the planning stage document template though the planning stage overview page;

receiving, at the product development site, one of a concept document based on the concept template and a concept screening document based on the concept screening template, the one of the concept document and the concept screening document being populated with data reflecting a concept for the product;

receiving, at the product development site, a first determination that the concept is approved for further development, wherein the first determination is based on the one of the concept document and the concept screening document;

after receiving the first determination, receiving, at the product development site, one of a service description document based on the service description template and an opportunity assessment document based on the opportunity assessment template, the one of the service description document and the opportunity assessment document being populated with data reflecting a design for the product;

receiving, at the product development site, a second determination to proceed with planning for the product, wherein the second determination is based on the one of the service description document and the opportunity assessment document;

after receiving the second determination, receiving, at the product development site, a planning stage document based on the planning stage document template, the planning stage document being populated with data reflecting a set of requirements associated with the product;

receiving, at the product development site, a third determination to proceed with developing the product, wherein the third determination is based on the planning stage document and a receipt of an indication of commitment for the product from an organization affected by the product;

developing the product based on the set of requirements reflected in the planning stage document, wherein the developing comprises conducting a trial to verify that the product meets one of the requirements; and receiving, after the product has been developed based on the set of requirements reflected in the planning stage document, the developing comprising conducting a trial to verify that the product meets one of the set of requirements, a fourth determination to deploy and implement the product, the fourth determination based on a result of the trial.

2. The computer-implemented method of claim 1, further comprising:
   deploying the product.
3. The computer-implemented method of claim 1, wherein the planning stage document is used for:
   identifying resources in the organization; and
   assigning the identified resources to develop the concept into the product.
4. The computer-implemented method of claim 3, wherein developing the product comprises:
   storing test data reflecting whether the identified resources meet the requirements reflected in the planning stage document.
5. The computer-implemented method of claim 1, further comprising:
   receiving additional data reflecting the concept for the product in a standardized form having a plurality of required fields.
6. The computer-implemented method of claim 1, further comprising:
   storing a set of metrics for measuring performance of the product.
7. A product development site comprising:
   a database;
   means for providing a home page over a network, the home page including a plurality of links to overview pages corresponding to stages of product development, the stages including at least a concept stage, a design stage subsequent to the concept stage, a planning stage subsequent to the design stage, and one or more stages subsequent to the planning stage, the overview pages including at least a concept stage overview page, a design stage overview page, and a planning stage overview page;
   means for storing, a plurality of concept stage document templates comprising at least a concept template and a concept screening template associated with the concept stage, a plurality of design stage document templates comprising a service description template and opportunity assessment template associated with the design stage, and a planning stage document template associated with the planning stage;
   means for providing electronic access to the plurality of concept stage document templates through the concept stage overview page, to the plurality of design stage document templates through the design stage overview page, and to the planning stage document template though the planning stage overview page;
   means for receiving one of a concept document based on the concept template and a concept screen document based on the concept screening template, the one of the concept document and the concept screening document data being populated with data reflecting a concept for the product;
   means for receiving, a first determination that the concept is approved for further development, wherein the first determination is based on the one of the concept document and the concept screening document;
   means for receiving, after receiving the first determination, one of a service description document based on the service description template and an opportunity assessment document based on the opportunity assessment template, the one of the service description document and the opportunity assessment document being populated with data reflecting a design for the product;
   means for receiving, a second determination to proceed with planning for the product, wherein the second determination is based on the one of the service description document and the opportunity assessment document;
   means for receiving, after receiving the second determination, a planning stage document based on the planning stage document template, the planning stage document data being populated with data reflecting a set of requirements associated with the product;
   means for receiving, a third determination to proceed with developing the product, wherein the third determination is based on the planning stage document and a receipt of an indication of commitment for the product from an organization affected by the product; and
   means for receiving, after the product has been developed based on the set of requirements reflected in the planning stage document, the developing comprising conducting a trial to verify that the product meets one of the set of requirements, a fourth determination to deploy and implement the product, the fourth determination based on a result of the trial.
8. The product development site of claim 7, wherein the planning stage document is used for:
   identifying resources in the organization; and
   assigning the identified resources to develop the concept into the product.
9. The product development site of claim 8 further comprising:
   means for storing test data reflecting whether the identified resources meet the requirements reflected in the planning stage document.
10. The product development site of claim 7, wherein the means for receiving the concept stage document further comprises:
   means for receiving additional data reflecting the concept for the product in a standardized form having a plurality of required fields.
11. The product development site of claim 7 further comprising:
   means for storing a set of metrics for measuring performance of the product.
12. A product development site comprising:
   a web server;
   a database; and
   a database server,
   the product development site configured to:
      provide a home page over a network, the home page including a plurality of links to overview pages corresponding to stages of product development, the stages including at least a concept stage, a design stage subsequent to the concept stage, a planning stage subsequent to the design stage, and one or more stages subsequent to the planning stage, the overview pages including at least a concept stage overview page, a design stage overview page, and a planning stage overview page;
   store, in the database, a plurality of concept stage document templates comprising at least a concept template and a concept screening template associated with the concept stage, a plurality of design stage document templates comprising a service description template and opportunity assessment template associated with the design stage, and a planning stage document template associated with the planning stage;
   provide electronic access to the plurality of concept stage document template through the concept stage overview page, to the plurality of design stage document templates through the design stage overview page, and to the planning stage document template though the planning stage overview page;

receive one of a concept document based on the concept template and a concept screen document based on the concept screening template, the one of the concept document and the concept screening document data being populated with data reflecting a concept for the product;

receive, a first determination that the concept is approved for further development, wherein the first determination is based on the one of the concept document and the concept screening document;

after receiving the first determination, receive one of a service description document based on the service description template and an opportunity assessment document based on the opportunity assessment template, the one of the service description document and the opportunity assessment document being populated with data reflecting a design for the product;

receive a second determination to proceed with planning for the product, wherein the second determination is based on the one of the service description document and the opportunity assessment document;

after receiving the second determination, receive a planning stage document based on the planning stage document template, the planning stage document data being populated with data reflecting a set of requirements associated with the product;

receive, a third determination to proceed with developing the product, wherein the third determination is based on the planning stage document and a receipt of an indication of commitment for the product from an organization affected by the product; and receive, after the product has been developed based on the set of requirements reflected in the planning stage document, the developing comprising conducting a trial to verify that the product meets one of the set of requirements, a fourth determination to deploy and implement the product, the fourth determination based on a result of the trial.

13. The product development site of claim 12, wherein the planning stage document is used for:
   identifying resources in the organization; and
   assigning the identified resources to develop the concept into the product.

14. The product development site of claim 13, wherein product development site is further configured to:
   store test data reflecting whether the identified resources meet the requirements reflected in the planning stage document.

15. The product development site of claim 12, wherein the product development site is further configured to:
   receive additional data reflecting the concept for the product in a standardized form having a plurality of required fields.

16. The product development site of claim 12, wherein the product development site is further configured to:
   store a set of metrics for measuring performance of the product.

* * * * *